United States Patent
Wang et al.

(10) Patent No.: US 12,432,015 B2
(45) Date of Patent: Sep. 30, 2025

(54) HARQ-ACK FEEDBACK METHOD, TERMINAL AND BASE STATION

(71) Applicant: DATANG MOBILE COMMUNICATIONS EQUIPMENT CO., LTD., Beijing (CN)

(72) Inventors: Junwei Wang, Beijing (CN); Rui Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 457 days.

(21) Appl. No.: 17/918,123

(22) PCT Filed: Apr. 12, 2021

(86) PCT No.: PCT/CN2021/086472
§ 371 (c)(1),
(2) Date: Oct. 11, 2022

(87) PCT Pub. No.: WO2021/213203
PCT Pub. Date: Oct. 28, 2021

(65) Prior Publication Data
US 2023/0133506 A1   May 4, 2023

(30) Foreign Application Priority Data
Apr. 23, 2020 (CN) .......................... 202010328490.3

(51) Int. Cl.
*H04L 1/1812* (2023.01)
*H04W 72/12* (2023.01)
*H04W 72/23* (2023.01)

(52) U.S. Cl.
CPC .......... *H04L 1/1812* (2013.01); *H04W 72/12* (2013.01); *H04W 72/23* (2023.01)

(58) Field of Classification Search
CPC ... H04L 1/1812; H04L 1/1822; H04L 1/1854; H04L 1/1861; H04L 1/1864;
(Continued)

(56) References Cited

U.S. PATENT DOCUMENTS 11,019,612 B2 * 5/2021 Ang .................. H04L 1/1861
11,025,371 B2 * 6/2021 Zhang ............... H04W 72/04
(Continued)

FOREIGN PATENT DOCUMENTS

CA  3083889 C  * 8/2023 .......... H04L 1/1607
CN  101689970 A    3/2010
(Continued)

OTHER PUBLICATIONS

European Patent Office, Extended European Search Report Issued in Application No. 21793154.2, Apr. 29, 2024, Germany, 9 pages.
(Continued)

*Primary Examiner* — Eric Nowlin
(74) *Attorney, Agent, or Firm* — KILPATRICK TOWNSEND & STOCKTON LLP

(57) ABSTRACT

Disclosed are a hybrid automatic repeat request-acknowledgment (HARQ-ACK) feedback method, a terminal, and a base station. The method includes: transmitting broadcast multicast scheduling signaling to a terminal for indicating the terminal to multiplex, when it is detected that a preset condition is satisfied, a first HARQ-ACK codebook corresponding to the broadcast multicast scheduling signaling on the uplink resource corresponding to unicast, the preset condition being that both a HARQ-ACK feedback slot indicated by the broadcast multicast scheduling signaling and a slot in which the uplink resource is located exist in a preset window; and receiving uplink data transmitted by the terminal through the uplink resource when the preset condition is satisfied, and obtaining a first HARQ-ACK code-
(Continued)

Receiving broadcast multicast scheduling signaling transmitted by a base station, and determining an uplink resource corresponding to unicast — 101

Multiplexing, when it is detected that a preset condition is satisfied, a first HARQ-ACK codebook corresponding to the broadcast multicast scheduling signaling on the uplink resource corresponding to unicast — 102 book multiplexed on the uplink resource. The protocol design and complexity of HARQ-ACK feedback for broadcast multicast is simplified.

18 Claims, 5 Drawing Sheets

(58) Field of Classification Search
CPC .............. H04L 5/0055; H04L 5/0094; H04L 2001/0093; H04W 72/12; H04W 72/1268; H04W 72/23; H04W 72/231; H04W 72/30

See application file for complete search history.

(56) References Cited

U.S. PATENT DOCUMENTS

| | | | |
|---|---|---|---|
| 11,329,839 B2* | 5/2022 | Belleschi | H04L 1/00 |
| 11,496,247 B2* | 11/2022 | Liu | H04L 1/1861 |
| 11,838,132 B2* | 12/2023 | Yeo | H04L 1/1812 |
| 11,996,947 B2* | 5/2024 | Wang | H04L 1/1819 |
| 12,028,167 B2* | 7/2024 | Wang | H04L 1/1861 |
| 2014/0355493 A1 | 12/2014 | Niu et al. | |
| 2017/0201964 A1* | 7/2017 | Gupta | H04W 76/40 |
| 2017/0353273 A1* | 12/2017 | Zhang | H04L 1/1671 |
| 2018/0076935 A1* | 3/2018 | Seo | H04L 1/00 |
| 2018/0152274 A1* | 5/2018 | Li | H04W 28/04 |
| 2019/0274131 A1* | 9/2019 | Yamazaki | H04W 72/21 |
| 2019/0349899 A1* | 11/2019 | Ang | H04W 72/0446 |
| 2020/0106566 A1* | 4/2020 | Yeo | H04L 1/1854 |
| 2020/0112941 A1* | 4/2020 | Yerramalli | H04W 72/30 |
| 2020/0195388 A1* | 6/2020 | Seo | H04L 1/1861 |
| 2020/0220694 A1* | 7/2020 | Khoryaev | H04W 28/04 |
| 2020/0235866 A1* | 7/2020 | Liu | H04L 1/1607 |
| 2020/0313745 A1* | 10/2020 | Yang | H04L 5/0055 |
| 2020/0313804 A1* | 10/2020 | Ryu | H04W 72/20 |
| 2020/0322921 A1* | 10/2020 | Zhou | H04W 72/30 |
| 2021/0250132 A1* | 8/2021 | Chen | H04L 69/324 |
| 2021/0385023 A1* | 12/2021 | Wang | H04L 1/1861 |
| 2022/0007348 A1* | 1/2022 | Wang | H04W 72/0453 |
| 2022/0078040 A1* | 3/2022 | Lee | H04L 5/003 |
| 2023/0076822 A1* | 3/2023 | Hao | H04W 72/30 |
| 2023/0124015 A1* | 4/2023 | Matsumura | H04L 5/0094 370/329 |
| 2024/0121034 A1* | 4/2024 | Yeo | H04W 28/04 |

FOREIGN PATENT DOCUMENTS

| | | | | |
|---|---|---|---|---|
| CN | 103703844 A | | 4/2014 | |
| CN | 108029139 A | | 5/2018 | |
| CN | 112425102 A | * | 2/2021 | ............ H04W 72/23 |
| CN | 110061824 B | * | 11/2021 | ............ H04L 1/1812 |
| CN | 112425102 B | * | 7/2024 | ............ H04L 1/1812 |
| WO | 2017015836 A1 | | 2/2017 | |
| WO | WO-2019217699 A1 | * | 11/2019 | ............ H04W 72/23 |
| WO | WO-2020067782 A1 | * | 4/2020 | ............ H04L 1/0003 |

OTHER PUBLICATIONS

LG Electronics, "Discussion on UE feedback for DL multicast/broadcast", 3GPP TSG RAN WG1 Meeting #85, Nanjing, China, May 23-27, 2016, total 5 pages, R1-164537.

* cited by examiner

HARQ-ACK FEEDBACK METHOD, TERMINAL AND BASE STATION

CROSS-REFERENCE TO RELATED APPLICATIONS

The present application is a US National Stage of International Application No. PCT/CN2021/086472, filed on Apr. 12, 2021, which claims the priority of the Chinese Patent No. 202010328490.3, filed on Apr. 23, 2020, and entitled "HARQ-ACK Feedback Method, Terminal, and Base Station", which are incorporated herein by reference in their entireties.

FIELD

The present application relates to the field of communication, and in particular, to a HARQ-ACK feedback method, a terminal, and a base station.

BACKGROUND

With the increasing popularity of mobile video services, peer-to-peer multicast/broadcast streaming, group communication, and broadcast/multicast Internet of Things (IoT) applications, the global mobile communication industry has reached a consensus that the 5th generation mobile communication (5G) network needs not only to have the capability to flexibly and dynamically allocate wireless spectrum and network resources between unicast services and multicast services, but also to support independent deployment of a broadcast multicast network.

In the current 5G, the base station transmits two types of data including terminal-oriented data, which can only be received by a target terminal, and is referred to unicast data; and data for all terminals or specific groups in a cell, that is, all users or users of a specific group in the cell can receive the services.

In addition, in order to ensure the communication quality of data, the terminal needs to perform hybrid automatic repeat request-acknowledgment (HARQ-ACK) feedback for transmitting broadcast multicast service data. The HARQ-ACK feedback is feedback information based on results of data reception. ACK is fed back when the data is received correctly (that is, the data is correctly received and acknowledged) while non-acknowledgment (NACK) is fed back when the data is received incorrectly (that is, the data is incorrectly received and acknowledged). However, when broadcast multicast data is transmitted by the base station, the transmitted data are group-based scheduling messages. When the terminal needs to feed back HARQ-ACK, it fails to effectively feedback HARQ-ACK information through traditional radio scheduling signaling mechanism base on the feedback from the terminal.

SUMMARY

Embodiments of the present application provide a hybrid automatic repeat request-acknowledgment (HARQ-ACK) feedback method to feed back HARQ-ACK by the terminal when the base station schedules broadcast multicast data, a terminal, and a base station.

An embodiment of the present application provides a HARQ-ACK feedback method, performed by a terminal, including:

receiving broadcast multicast scheduling signaling transmitted by a base station, and determining an uplink resource corresponding to unicast; and multiplexing, when it is detected that a preset condition is satisfied, a first HARQ-ACK codebook corresponding to the broadcast multicast scheduling signaling on the uplink resource corresponding to unicast, the preset condition being that both a HARQ-ACK feedback slot indicated by the broadcast multicast scheduling signaling and a slot in which the uplink resource is located exist in a preset window.

An embodiment of the present application provides a hybrid automatic repeat request-acknowledgment (HARQ-ACK) feedback method, performed by a base station, including:

transmitting broadcast multicast scheduling signaling to a terminal for indicating the terminal to multiplex, when it is detected that a preset condition is satisfied, a first HARQ-ACK codebook corresponding to the broadcast multicast scheduling signaling on an uplink resource corresponding to unicast, the preset condition being that both a HARQ-ACK feedback slot indicated by the broadcast multicast scheduling signaling and a slot in which the uplink resource is located exist in a preset window; and receiving uplink data transmitted by the terminal through the uplink resource when the preset condition is satisfied, and obtaining a first HARQ-ACK codebook multiplexed on the uplink resource.

An embodiment of the present application provides a hybrid automatic repeat request-acknowledgment (HARQ-ACK) feedback device, applied to a terminal, including:

a receiving device, configured to receive the broadcast multicast scheduling signaling transmitted by a base station, and determine an uplink resource corresponding to unicast; and a multiplexing device, configured to multiplex, when it is detected that a preset condition is satisfied, a first HARQ-ACK codebook corresponding to the broadcast multicast scheduling signaling on the uplink resource corresponding to unicast, the preset condition being that a HARQ-ACK feedback slot indicated by the broadcast multicast scheduling signaling and a slot in which the uplink resource is located exist simultaneously in a preset window.

An embodiment of the present application provides a hybrid automatic repeat request-acknowledgment (HARQ-ACK) feedback device, applied to a base station, including:

a transmitting device, configured to transmit broadcast multicast scheduling signaling to a terminal for indicating the terminal to multiplex, when it is detected that a preset condition is satisfied, a first HARQ-ACK codebook corresponding to the broadcast multicast scheduling signaling on the uplink resource corresponding to unicast, the preset condition being that a HARQ-ACK feedback slot indicated by the broadcast multicast scheduling signaling and a slot in which the uplink resource is located exist simultaneously in a preset window; and a receiving device, configured to receive uplink data transmitted by the terminal through the uplink resource when the preset condition is satisfied, and obtain a first HARQ-ACK codebook multiplexed on the uplink resource.

An embodiment of the present application provides a terminal, including a processor and a memory having computer programs stored thereon, that, when executed on the processor, cause the processor to perform steps of the HARQ-ACK feedback method performed by a terminal.

An embodiment of the present application provides a base station, including a processor and a memory having a computer program stored thereon, that, when executed on the processor, causes the processor to perform steps of the HARQ-ACK feedback method performed by a base station.

The present application provides a non-transitory computer-readable storage medium having a computer program stored thereon, that, when executed by a processor, causes the processor to perform steps of the steps of the HARQ-ACK feedback method mentioned above.

According to the HARQ-ACK feedback method, terminal, and base station provided by the embodiments of the present application, the first HARQ-ACK codebook corresponding to the broadcast multicast scheduling signaling is multiplexed on the uplink resource corresponding to unicast when both a HARQ-ACK feedback slot indicated by the broadcast multicast scheduling signaling and a time slot in which the uplink resource corresponding to unicast is located exist in the preset window after the broadcast multicast scheduling signaling transmitted by the base station is received, and thus the protocol design and complexity of HARQ-ACK feedback for broadcast multicast is simplified and the problem that the terminal requires different formats for PUCCH in different locations of the cell can be effectively solved.

BRIEF DESCRIPTION OF THE DRAWINGS

In order to more clearly illustrate the solutions disclosed in the embodiments of the present application or the related art, the drawings used in the descriptions of the embodiments or the related art will be briefly described below. The drawings in the following description are only some embodiments of the present application.

DETAILED DESCRIPTION

Figure 1:
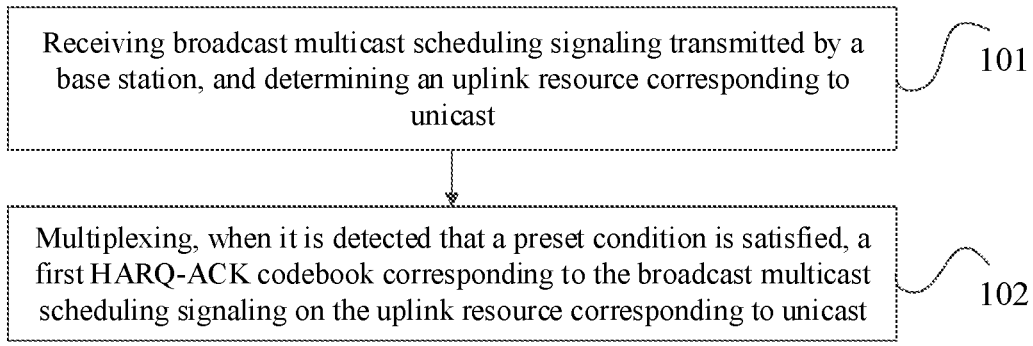
FIG. 1 is a flowchart showing steps of a HARQ-ACK feedback method performed by a terminal according to an embodiment of the present application.

In order to illustrate the embodiments of the present application clearer, the embodiments of the present application are clearly and completely described in the following with reference to the accompanying drawings in the present application. These embodiments are a part of the embodiments of the present application, and not all of the embodiments.

For clearly describing embodiments of the present application, words such as "first" and "second" in each embodiment of the present application are used to distinguish the same or similar items that have basically the same function and effect and it is appreciated that these words such as "first" and "second" do not limit the quantity and execution order.

In the embodiments of the present application, the term "and/or" describes a related relationship of associated objects, and indicates that there can be three kinds of relationships. For example, A and/or B can represent that only A exists, both A and B exist, and only B exists. Words "three kinds" generally indicate that the associated objects have "or" relationship.

In the embodiments of the present application, the term "multiple" refers to two or more than two, and other quantifiers are similar.

Furthermore, it should be understood that "one embodiment" or "an embodiment" throughout the specification means that a particular feature, structure, or characteristic associated with the embodiment is included in at least one embodiment of the present application. Thus, "in one embodiment" or "in an embodiment" throughout this specification does not necessarily refer to the same embodiment. Furthermore, the particular features, structures or characteristics may be combined in any suitable manner in one or more embodiments.

In various embodiments of the present application, it should be understood that the size of the sequence numbers of the following processes does not imply the sequence of execution, and the execution sequence of each process should be determined by its functions and internal logic, rather than limiting the implementation of embodiments in the present application.

In the environment of wireless communication, an error may occur in data transmission since channel quality changes rapidly, and thus a HARQ procedure is used in a standard to improve the reliability of data transmission and may meet the requirements of different transmission quality for different services. A typical HARQ procedure is described as follows. A transmitting end (base station) initially transmits a data transport block (TB1) to a receiving end (terminal), and indicates the terminal of a slot and physical uplink control channel (PUCCH) resource information on which HARQ-ACK is fed back; the receiving end decodes TB1 and feeds back NACK to the transmitting end on the PUCCH resource of the specified slot when decoding result is error; after receiving NACK information, the transmitting end resend TB1 and indicates the terminal of PUCCH resource information on which the HARQ-ACK is fed back; the terminal decodes TB1 again (the terminal may combine the previous data with TB1) and feeds back ACK to the transmitting end when the decoding result is correct; the receiving end feeds back ACK to the transmitting end on the PUCCH resource of the specified slot; and the transmitting end receives the ACK information and this data transmitting process is completed. For a HARQ scheduling process for unicast, only one receiving end is suitable for performing HARQ-ACK feedback, but for the broadcast multicast service, a group of terminals or all terminals in the cell receive the service, and thus traditional HARQ scheduling and feedback indication mechanism for unicast is unsuitable for cellular-based broadcast multicast feedback.

In addition, sidelink is based on the terminal-to-terminal communication link. For sidelink broadcast multicast communication, there are two main schemes for sidelink HARQ feedback.

Scheme 1: HARQ NACK-based feedback scheme. In this scheme, all receiving ends share the same physical sidelink feedback channel (PSFCH) resource for feeding back HARQ-ACK. If any terminal is unable to correctly receive the physical sidelink shared channel (PSSCH) used for transmitting service data, the HARQ NACK information is transmitted on the shared PSFCH resource. For this scheme, the base station cannot identify which terminal feeds back NACK, and cannot perform adaptive transmission adjustment for the link quality of the terminals that feeds back NACK. That is, the channel quality information cannot be effectively used, and results in waste of wireless air interface resources. In addition, the terminal does not feedback NACK when no broadcast multicast scheduling signaling is detected, and the base station considers that all terminals have correctly received the data, which will lead to poor broadcast multicast data transmission performance.

Scheme 2: HARQ ACK/NACK-based feedback scheme. In this scheme, each receiving end has its own independent PSFCH resource, and transmits HARQ ACK/NACK information on the corresponding PSFCH resource according to whether it receives the PSSCH correctly. The scheme is mainly applied to an occasion of few terminals in the group. For this scheme, uplink feedback resources need to be allocated to all terminals and it will be difficult to allocate uplink channel resources when the number of terminals receiving the broadcast multicast service is relatively large. Due to different locations of different receiving ends and base stations, 2 symbols, 4 symbols, or even 14 symbols need to be occupied to effectively feedback HARQ-ACK. The resource allocation in the traditional scheme has a unified format, which cannot meet the cellular demand for HARQ-ACK feedback.

For the HARQ-ACK feedback problem in the above-mentioned various occasions, the present application provides the following embodiments.

FIG. 1 is a flowchart showing steps of a HARQ-ACK feedback method performed by a terminal according to an embodiment of the present application and the method includes the following steps.

Step 101: receiving broadcast multicast scheduling signaling transmitted by a base station, and determining an uplink resource corresponding to unicast.

In an embodiment, the terminal receives the broadcast multicast scheduling signaling transmitted by a base station, and determines an uplink resource corresponding to unicast.

The uplink resource corresponding to unicast can be used to feed back the HARQ-ACK for unicast, and the uplink resource includes a PUCCH resource or PUSCH resource.

Step 102: multiplexing, when it is detected that a preset condition is satisfied, a first HARQ-ACK codebook corresponding to the broadcast multicast scheduling signaling on the uplink resource corresponding to unicast.

In an embodiment, the preset condition is that both a HARQ-ACK feedback slot indicated by the broadcast multicast scheduling signaling and a slot in which the uplink resource is located exist in a preset window.

The terminal multiplexes the first HARQ-ACK codebook corresponding to the broadcast multicast scheduling signaling on the uplink resource corresponding to unicast after receiving the broadcast multicast scheduling signaling transmitted by the base station when both a HARQ-ACK feedback slot indicated by the broadcast multicast scheduling signaling and a slot in which the uplink resource corresponding to unicast is located exist in the preset window, which simplifies protocol design and complexity of HARQ-ACK feedback for broadcast multicast and effectively solves the problem that the terminal requires different formats for PUCCH in different locations of the cell.

In an embodiment, HARQ-ACK information indicated by the broadcast multicast scheduling signaling may not be fed back or the HARQ-ACK information is fed back on the PUCCH resource indicated by the broadcast multicast scheduling signaling when it is detected that both the HARQ-ACK feedback slot indicated by the broadcast multicast scheduling signaling and a slot where the uplink resource is located do not exist in the preset window.

In addition, in the present embodiment, the terminal may receive the unicast scheduling signaling transmitted by the base station when determining the uplink resource corresponding to the unicast, where the unicast scheduling signaling carries scheduling information for the uplink resource; or receive periodic uplink resource information configured by the base station through higher layer signaling, and determine the uplink resource corresponding to unicast based on the periodic uplink resource information, where the periodic uplink resource information includes a transmission period and slot offset of the uplink resource, and the uplink resource is a PUCCH resource or a PUSCH resource.

That is, in the present embodiment, the uplink resource corresponding to unicast can be determined by unicast scheduling signaling or configured by the higher layer signaling.

In an embodiment, the cells included in the downlink control information (DCI) in the unicast scheduling signaling are represented as follows: a frequency domain resource allocation indicator, a time domain resource allocation indicator, a modulation and coding format, a redundant coding version, a new data indicator, a HARQ process ID, a PUCCH resource indicator and a HARQ feedback time indicator. In an embodiment, the HARQ-ACK feedback slot can be calculated by using the "time domain resource allocation indicator" and "HARQ feedback time indicator" in the above control signaling.

In addition, the periodic uplink resource information configured by the base station through higher layer signaling includes the transmission period and the slot offset of the uplink resource, that is, includes: the transmission period of PUSCH or PUCCH, such as {slot1, slot2, slot4, slot 8, slot 16}; and the slot offset of PUSCH or PUCCH. For example, it is assumed that the transmission period of the PUCCH resource or the PUSCH resource is 4 slots and the offset is 0 slot through configuration, that is, there are corresponding PUCCH or PUSCH configurations on uplink slots 0, 4, 8, 12 . . . .

It should be noted here that when the uplink resource is a resource scheduled by the unicast scheduling signaling and used for transmitting unicast HARQ-ACK information, the preset condition further includes that a time for receiving the unicast scheduling signaling is previous to the HARQ-ACK feedback slot indicated by the broadcast multicast scheduling signaling and has an interval of X or more symbols away from the HARQ-ACK feedback slot, and the slot in which the uplink resource is located meets a reception-processing time of the service data corresponding to the broadcast multicast scheduling signaling; and a value of X is a sum of a processing time for receiving the unicast scheduling signaling by the terminal and a time for multiplexing the first HARQ-ACK codebook corresponding to the broadcast multicast scheduling signaling. This provides conditions for the terminal to multiplex the first HARQ-ACK codebook corresponding to the broadcast multicast scheduling signaling on the uplink resource corresponding to unicast.

In addition, in the present embodiment, it can be explicitly indicated that the first HARQ-ACK codebook corresponding to the broadcast multicast scheduling signaling is multiplexed on the uplink resource corresponding to unicast. In this case, the first DCI corresponding to the broadcast multicast scheduling signaling includes a request message used for indicating whether the terminal waits for information carried in the unicast scheduling signaling, the carried information includes indication information for indicating whether the uplink resource carries the first HARQ-ACK codebook; a second DCI corresponding to the unicast scheduling signaling includes a response message used for indicating whether to carry the first HARQ-ACK codebook in the uplink resource.

That is, DCI corresponding to the broadcast multicast scheduling signaling and unicast scheduling signaling is added with an indication for indicating the terminal to multiplex the first HARQ-ACK codebook corresponding to the broadcast multicast scheduling signaling to the uplink resource corresponding to unicast.

In an embodiment, the request message includes a first indication field and identification information of the first HARQ-ACK codebook. The first indication field is used for indicating the terminal whether to wait for the information carried in the unicast scheduling signaling, a new field with a request message is added in the first DCI, or an original field in the first DCI is used by an indication meaning for the request message. The response message includes a second indication field and the identification information of the first HARQ-ACK codebook. The second indication field is used for indicating whether to carry the first HARQ-ACK codebook in the uplink resource, a new field with a response message is added in the second DCI, or an original field in the second DCI is used by an indication meaning for the response message.

There is a correspondence between the identification information of each HARQ-ACK codebook and the codebook number of the HARQ-ACK.

In an embodiment, a first indication field and identification information of the first HARQ-ACK codebook may be newly added to the first DCI in the broadcast multicast scheduling signaling, and the first indication field may be 1 bit. In this case, a bit of 0 indicates that the terminal waits for the information carried in the unicast scheduling signaling, and a bit of 1 indicates that the terminal does not wait for the information carried in the unicast scheduling signaling. In an embodiment, the broadcast multicast scheduling signaling carrying the request message may be referred to as a specific broadcast multicast scheduling signaling.

In addition, the request message may further be carried in the first DCI by newly adding an indication meaning for the request message to the original field in the first DCI. For example, 2 bits of the "PUCCH power control command" are used for indicating the identification information of the first HARQ-ACK codebook and the PUCCH power control command is invalid in broadcast multicast and can be used as reserved bits. The number of bits used in the modulation and coding format of 5 bits is decreased by 1 bit, that is, the modulation and coding format becomes 4 bits and the decreased 1 bit is used for indicating "whether the terminal waits for the information carried in the unicast scheduling signaling" and the reason why 5 bits can be decreased to 4 bits is that the performance requirements of most terminals need to be satisfied based on the situation of broadcast multicast scheduling and thus the code rate and modulation order of the broadcast multicast scheduling will not be too high.

In addition, a second indication field and identification information of the first HARQ-ACK codebook may be newly added to the second DCI in the unicast scheduling signaling. The second indication field may be 1 bit. In this case, a bit of 0 indicates that the first HARQ-ACK codebook is carried in the uplink resource, and a bit of 1 indicates that no first HARQ-ACK codebook is carried in the uplink resource. The identification information of a HARQ-ACK codebook may be 2 bits for distinguishing 4 codebooks. In an embodiment, the unicast scheduling signaling carrying the response message may be referred to as a specific unicast scheduling signaling.

In addition, in another way, the response message includes a K-bit carrying-identified bitmap, where K represents the maximum number of HARQ-ACK codebooks for broadcast multicast, when the value of the bits is a first preset value, it means that the corresponding HARQ-ACK codebooks are carried, and when the value of the bit is a second preset value, it means that no corresponding HARQ-ACK codebook is carried. That is, whether to carry the corresponding HARQ-ACK codebooks for broadcast multicast can also be indicated by means of a bitmap.

In this case, the terminal can be indicated to multiplex the first HARQ-ACK codebook corresponding to the broadcast multicast on the uplink resource corresponding to unicast in an explicitly indicated manner and may determine whether to perform HARQ-ACK multiplexing first by the signaling before determining whether the preset condition for multiplexing is satisfied and thus the multiplexing efficiency is improved.

In addition, in the present embodiment, before it is determined whether the preset condition is satisfied, the specific information of the preset window needs to be determined first. In the present embodiment, the configuration information of the preset window predefined by a protocol may be obtained; or the configuration information of the preset window sent by the base station through higher layer signaling may be received, where the configuration information includes a start reference position (P0), a start position offset of the preset window and a length (L) of the preset window.

In an embodiment, the start reference position of the preset window includes any one of the following:
  a position of the HARQ-ACK feedback slot indicated by the broadcast multicast scheduling signaling; or
  a slot in which the PUCCH resource indicated by the unicast scheduling signaling is located; or
  an end time of the physical downlink shared channel (PDSCH) corresponding to the broadcast multicast scheduling signaling; or
  a slot in which one of the periodic uplink resources configured by the base station is located; or
  a time for receiving broadcast multicast scheduling signaling.

In an embodiment, the start position offset of the preset window may be a positive value, a negative value, or 0. When the offset is a positive value, it means that the start position of the window is offset time units (such as slots) subsequent to P0; if it is a negative value, it means that the start position of the window is offset time units (such as slots) previous to P0; and if it is 0, it means that the start position of the window starts from point P0. For example, the start position offset and/or the length of the preset window satisfies any of the following:

the start position offset of the preset window is a positive value, a negative value, or 0 when the start reference position is a position of the HARQ-ACK feedback slot indicated by the broadcast multicast scheduling signaling or a position of the slot in which the PUCCH resource indicated by the unicast scheduling signaling is located, a length of the preset window is one slot; or the start position offset is d when the start reference position is an end time of the PDSCH corresponding to the broadcast multicast scheduling signaling, where d is greater than or equal to the sum of a processing time for receiving PDSCH by the terminal and a time for multiplexing the first HARQ-ACK codebook corresponding to the broadcast multicast scheduling signaling; or the start position offset is a negative value when the start reference position is a slot in which one of the periodic uplink resources configured by the base station is located; or the start position offset is a positive value or 0 when the start reference position is a time for receiving the broadcast multicast scheduling signaling, and the length of the preset window is from the start position to a position of the HARQ-ACK feedback slot indicated by the broadcast multicast scheduling signaling.

It should be noted that, if the offset is always equal to 0, the offset parameter may not be set, and the start position of the preset window is P0.

In the present embodiment, when the first HARQ-ACK codebook corresponding to the broadcast multicast scheduling signaling is multiplexed on the uplink resource, an order of the first HARQ-ACK codebook and a second HARQ-ACK codebook that is already in the uplink resource may be defined as follows.

In this case, the order in which the first HARQ-ACK codebook and a second HARQ-ACK codebook present on the uplink resource are arranged on the uplink resource may satisfy one of the following cases:

the first HARQ-ACK codebook is arranged previous to the second HARQ-ACK codebook, the first HARQ-ACK codebook is arranged subsequent to the second HARQ-ACK codebook, the first and second HARQ-ACK codebooks are arranged in a sequential order of the PUCCH resource corresponding to the first HARQ-ACK codebook before multiplexing and the PUCCH resource corresponding to the second HARQ-ACK codebook; or the first and second HARQ-ACK codebooks are arranged in a receiving order of the broadcast multicast scheduling signaling and the unicast scheduling signaling.

In addition, when the number of the broadcast multicast scheduling signaling is two or more, and two or more first HARQ-ACK codebooks corresponding to the two or more broadcast multicast scheduling signaling are multiplexed on the uplink resources, two or more first HARQ-ACK codebooks may be arranged on the uplink resources in one of the following orders:

a sequential order of a first HARQ-ACK feedback time indicated by each broadcast multicast scheduling signaling, the two or more first HARQ-ACK codebooks being arranged in an ascending order of numbers of carriers when the first HARQ-ACK feedback times indicated by the two or more broadcast multicast scheduling signaling are the same and the two or more first HARQ-ACK codebooks being arranged in an ascending order of indexes of broadcast multicast services when the first HARQ-ACK feedback times indicated by the two or more broadcast multicast scheduling signaling are the same and the numbers of carriers are the same; or an index order of the first HARQ-ACK codebooks indicated by each broadcast multicast scheduling signaling.

That is, when the HARQ-ACK codebook is multiplexed in the present embodiment, the multiplexing may be performed in any of the above-mentioned orders, which is not limited herein.

In addition, in the present embodiment, the first HARQ-ACK codebook may be multiplexed on the uplink resource closest to the start reference position of the preset window; or, the first HARQ-ACK codebook is multiplexed on the first uplink resource in the preset window when the first HARQ-ACK codebook corresponding to the broadcast multicast scheduling signaling is multiplexed onto the uplink resources corresponding to unicast in case that the number of uplink resources is two or more.

That is, it defines the first HARQ-ACK codebook corresponding to the broadcast multicast scheduling signaling may be multiplexed on which uplink resource among the multiple uplink resources by above methods which facilitates the reception of the first HARQ-ACK through the base station.

In the present embodiment, by multiplexing the first HARQ-ACK codebook corresponding to the broadcast multicast scheduling signaling on the uplink resource corresponding to unicast after the broadcast multicast scheduling signaling transmitted by the base station is received when both a HARQ-ACK feedback slot indicated by the broadcast multicast scheduling signaling and a slot in which the uplink resource corresponding to unicast is located exist in the preset window, the protocol design and complexity of HARQ-ACK feedback for broadcast multicast is simplified and the problem that the terminal requires different formats for PUCCH in different locations of the cell can be effectively solved.

Figure 2:
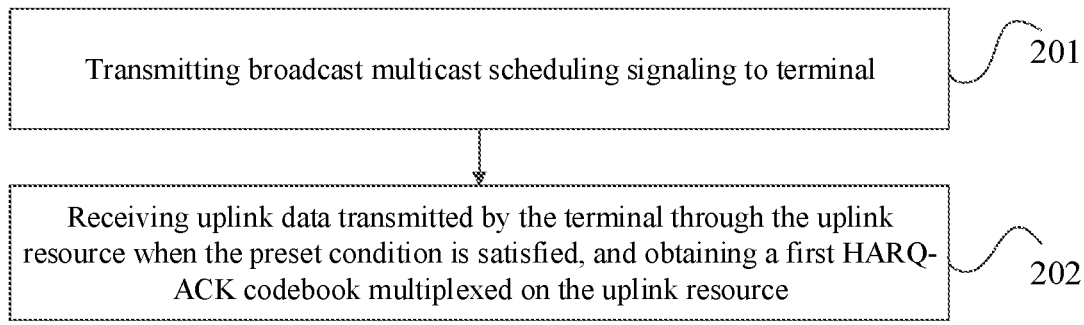
FIG. 2 is a flowchart showing steps of a HARQ-ACK feedback method performed by a base station according to an embodiment of the present application.

FIG. 2 is a flowchart showing steps of a HARQ-ACK feedback method performed by a base station according to an embodiment of the present application and the method includes the following steps.

Step 201: transmitting broadcast multicast scheduling signaling to a terminal.

In an embodiment, after transmitting the broadcast multicast scheduling signaling to a terminal, the terminal multiplexes, when it is detected that a preset condition is satisfied, a first HARQ-ACK codebook corresponding to the broadcast multicast scheduling signaling on the uplink resource corresponding to unicast, the preset condition being that both a HARQ-ACK feedback slot indicated by the broadcast multicast scheduling signaling and a slot in which the uplink resource is located exist in a preset window. The protocol design and complexity of HARQ-ACK feedback for broadcast multicast is simplified and the problem that the terminal requires different formats for PUCCH in different locations of the cell can be effectively solved.

Step 202: receiving uplink data transmitted by the terminal through the uplink resource when the preset condition is satisfied, and obtaining a first HARQ-ACK codebook multiplexed on the uplink resource.

In an embodiment, the base station needs to receive uplink data transmitted by the terminal through the uplink resource when the preset condition is satisfied, and obtains a first HARQ-ACK codebook by demultiplexing.

When obtaining the first HARQ-ACK codebook by demultiplexing, the base station needs to perform demultiplexing based on the order in which the terminal multiplexes the first HARQ-ACK codebook corresponding to broadcast multicast.

It should be noted that, the base station can further receive HARQ-ACK information fed back on the PUCCH resource indicated by the broadcast multicast scheduling signaling when the terminal detects that the HARQ-ACK feedback slot indicated by the broadcast multicast scheduling signaling and the slot in which the uplink resource is located do not both exist in the preset window.

It should also be noted that when the number of uplink resources is two or more, the first HARQ-ACK codebook is multiplexed on the uplink resource closest to the start reference position of the preset window; or the first HARQ-ACK code is multiplexed on a first uplink resource within the preset window.

In the present embodiment, the terminal needs to be configured with an uplink resource corresponding to the unicast. In this case, unicast scheduling signaling may be transmitted to the terminal where the unicast scheduling signaling carries scheduling information for the uplink resource; or periodic uplink resource information is configured by higher layer signaling to the terminal and the terminal determines the uplink resource corresponding to unicast based on the periodic uplink resource information, where the periodic uplink resource information includes a transmission period and slot offset of the uplink resource, and the uplink resource is a PUCCH resource or a PUSCH resource.

In an embodiment, when the uplink resource is a resource scheduled by the unicast scheduling signaling and used for transmitting unicast HARQ-ACK information, the preset condition further includes that a time for receiving the unicast scheduling signaling is previous to the HARQ-ACK feedback slot indicated by the broadcast multicast scheduling signaling and has an interval of X or more symbols away from the HARQ-ACK feedback slot and the slot in which the uplink resource is located meets a reception-processing time of the service data corresponding to the broadcast multicast scheduling signaling; and a value of X is a sum of a processing time for receiving the unicast scheduling signaling by the terminal and a time for multiplexing the first HARQ-ACK codebook corresponding to the broadcast multicast scheduling signaling.

In the present embodiment, the first downlink control information (DCI) corresponding to the broadcast multicast scheduling signaling includes a request message used for indicating the terminal whether to wait for information carried in the unicast scheduling signaling, the carried information includes indication information for indicating whether to carry the first HARQ-ACK codebook in the uplink resource; a second DCI corresponding to the unicast scheduling signaling includes a response message used for indicating whether to carry the uplink resource in the first HARQ-ACK codebook.

In an embodiment, the request message includes a first indication field and identification information of the first HARQ-ACK codebook. The first indication field is used for indicating the terminal whether to wait for the information carried in the unicast scheduling signaling, a new field with a request message is added in the first DCI, or an original field in the first DCI is used by an indication meaning for the request message. The response message includes a second indication field and the identification information of the first HARQ-ACK codebook. The second indication field is used for indicating whether to carry the first HARQ-ACK codebook in the uplink resource, a new field with a response message is added in the second DCI, or an original field in the second DCI is used by an indication meaning for the response message, where there is a correspondence between the identification information of each HARQ-ACK codebook and the codebook number of the HARQ-ACK.

In another way, the response message includes a K bits carrying-identified bitmap, where K represents the maximum number of HARQ-ACK codebooks for broadcast multicast, when a value of a bit is a first preset value, it means that a corresponding HARQ-ACK codebook is carried, and when the value of the bit is a second preset value, it means that no corresponding HARQ-ACK codebook is carried.

In the present embodiment, the related configuration information of the preset window also needs to be predetermined. In this case, the base station may obtain the configuration information of the preset window predefined by a protocol; or transmit the configuration information of the preset window to the terminal through higher layer signaling, where the configuration information includes a start reference position, a start position offset of the preset window and a length of the preset window.

In an embodiment, the start reference position of the preset window includes any one of the following:
   a position of the HARQ-ACK feedback slot indicated by the broadcast multicast scheduling signaling; or
   a slot in which the PUCCH resource indicated by the unicast scheduling signaling is located; or
   an end time of the physical downlink shared channel (PDSCH) corresponding to the broadcast multicast scheduling signaling; or
   a slot in which one of the periodic uplink resources configured by the base station is located; or
   a time for receiving broadcast multicast scheduling signaling.

The start position offset and/or the length of the preset window satisfies any of the following:
   the start position offset of the preset window is a positive value, a negative value, or 0 when the start reference position is a position of the HARQ-ACK feedback slot indicated by the broadcast multicast scheduling signaling or a position of the slot in which the PUCCH resource indicated by the unicast scheduling signaling is located, a length of the preset window is one slot; or
   the start position offset is d when the start reference position is an end time of the PDSCH corresponding to the broadcast multicast scheduling signaling, where d is greater than or equal to the sum of a processing time for receiving PDSCH by the terminal and a time for multiplexing the first HARQ-ACK codebook corresponding to the broadcast multicast scheduling signaling; or
   the start position offset is a negative value when the start reference position is a slot in which one of the periodic uplink resources configured by the base station is located; or
   the start position offset is a positive value or 0 when the start reference position is a time for receiving the broadcast multicast scheduling signaling, and the length of the preset window is from the start position to a position of the HARQ-ACK feedback slot indicated by the broadcast multicast scheduling signaling.

In the present embodiment, the order in which the first HARQ-ACK codebook and a second HARQ-ACK codebook that is already in the uplink resource are arranged in the uplink resource satisfies one of the following cases:

the first HARQ-ACK codebook is arranged previous to the second HARQ-ACK codebook;

the first HARQ-ACK codebook is arranged subsequent to the second HARQ-ACK codebook; the first and second HARQ-ACK codebooks are arranged in a sequential order of the PUCCH resource corresponding to the first HARQ-ACK codebook before multiplexing and the PUCCH resource corresponding to the second HARQ-ACK codebook; or the first and second HARQ-ACK codebooks are arranged in a receiving order of the broadcast multicast scheduling signaling and the unicast scheduling signaling.

It should be noted that, when the number of the broadcast multicast scheduling signaling is two or more, and two or more first HARQ-ACK codebooks corresponding to the two or more broadcast multicast scheduling signaling are multiplexed on the uplink resources, two or more first HARQ-ACK codebooks are arranged on the uplink resources in one of the following orders:

a sequential order of a first HARQ-ACK feedback time indicated by each broadcast multicast scheduling signaling, the two or more first HARQ-ACK codebooks being arranged in an ascending order of numbers of carriers when the first HARQ-ACK feedback times indicated by the two or more broadcast multicast scheduling signaling are the same and the two or more first HARQ-ACK codebooks being arranged in an ascending order of indexes of broadcast multicast services when the first HARQ-ACK feedback times indicated by the two or more broadcast multicast scheduling signaling are the same and the numbers of carriers are the same; or an index order of the first HARQ-ACK codebooks indicated by each broadcast multicast scheduling signaling.

It should be noted here that, for the description of the base station side, reference may be made to the related content on the terminal side, which will not be repeated here.

The present application will be specifically described below through specific embodiments.

Embodiment 1

The HARQ-ACK feedback process in the present embodiment includes the following steps.

In step 1, the terminal receives broadcast multicast scheduling signaling transmitted by the base station.

The broadcast multicast scheduling signaling in this step may be traditional broadcast multicast scheduling signaling, which will not be repeated here.

In step 2, the terminal receives unicast scheduling signaling transmitted by the base station.

The unicast scheduling signaling in this step may be a traditional unicast scheduling signaling, that is, elements in the DCI in the signaling include a frequency domain resource allocation indicator, a time domain resource allocation indicator, a modulation and coding format, a redundant coding version, a new data indicator, a PUCCH resource indicator, a HARQ feedback time indicator, etc. and will not be repeated here.

In step 3: the terminal multiplexes, when it is detected that a preset condition is satisfied, a first HARQ-ACK codebook corresponding to the broadcast multicast scheduling signaling on the uplink resource indicated by the unicast scheduling signaling.

In an embodiment, the preset condition is that both a HARQ-ACK feedback slot indicated by the broadcast multicast scheduling signaling and a slot in which the uplink resource is located exist in a preset window.

The process of determining whether the preset condition is satisfied is as follows: firstly, obtaining the configuration information of the preset window, including the start position and a start position offset of the preset window, and a length of the preset window. In addition, the terminal and the base station can determine the configuration information of the preset window by default through an interface protocol, or the base station can configure the configuration information to the terminal through higher layer signaling. The terminal then calculates a position of the HARQ-ACK feedback slot indicated by the broadcast multicast scheduling signaling. Finally, it is determined whether there is an uplink resource within the preset window.

Figure 3:
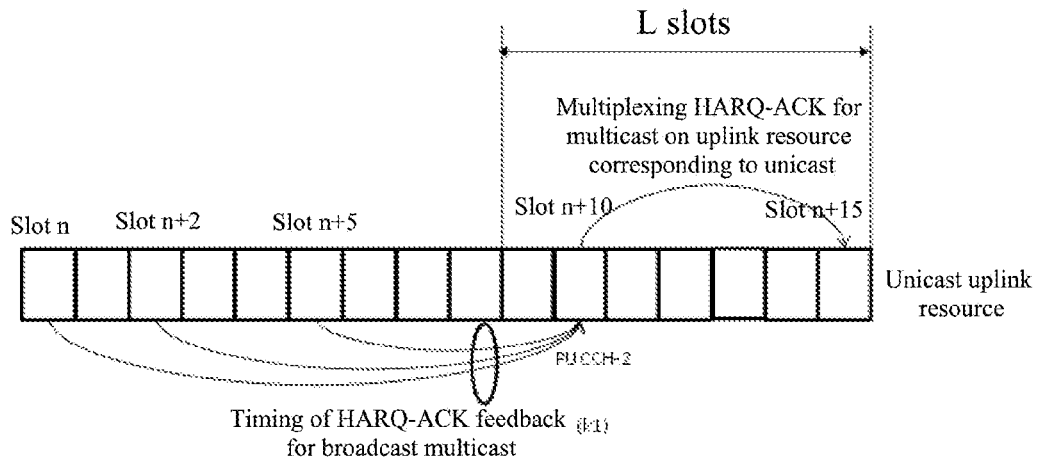
FIG. 3 is a schematic diagram corresponding to a first embodiment of the present application.

For example, in case that the start reference position of the preset window is the position of the HARQ-ACK feedback slot indicated by the broadcast multicast scheduling signaling, the start position offset is −1 and the length L=6. As shown in FIG. 3, the base station schedules broadcasts multicast data at slot n/n+2/n+5, the scheduling signaling indicates that the HARQ-ACK feedback slot for broadcast multicast is at slot n+10, that is, there is a PUCCH resource for broadcast multicast feedback at slot n+10 and there is an uplink scheduling resource on slot n+15 in the preset window with slot n+9 as the start position, which satisfies a condition under that the terminal multiplexes a HARQ-ACK codebook for broadcast multicast on the uplink resource.

When the condition is satisfied, the HARQ-ACK codebook for broadcast multicast is multiplexed on the PUCCH resource for unicast HARQ-ACK feedback. Two HARQ-ACK codebooks, including a first HARQ-ACK codebook for broadcast multicast and a second HARQ-ACK codebook for unicast, are carried in the PUCCH resource. The order in which the first HARQ-ACK codebook and the second HARQ-ACK codebook are arranged may satisfy one of the following cases:

the first HARQ-ACK codebook is arranged previous to the second HARQ-ACK codebook;

the first HARQ-ACK codebook is arranged subsequent to the second HARQ-ACK codebook; the first and second HARQ-ACK codebooks are arranged in a sequential order of the PUCCH resource corresponding to the first HARQ-ACK codebook before multiplexing and the PUCCH resource corresponding to the second HARQ-ACK codebook; that is, before multiplexing, if "a PUCCH resource for transmitting the broadcast multicast HARQ-ACK codebook" is located previous to "a PUCCH resource for transmitting the unicast HARQ-ACK codebook", the HARQ-ACK codebook for broadcast multicast is then arranged previous to the HARQ-ACK codebook for unicast, otherwise, the HARQ-ACK codebook for broadcast multicast is then arranged subsequent to the HARQ-ACK codebook for unicast, or vice versa;

the first and second HARQ-ACK codebooks are arranged in a receiving order of the broadcast multicast scheduling signaling and the unicast scheduling signaling, that is, if "control signaling for scheduling broadcast multicast" is previous to the "control signaling for scheduling unicast", the HARQ-ACK codebook for broadcast multicast is then arranged previous to the HARQ-ACK codebook for unicast, otherwise, the HARQ-ACK codebook for broadcast multicast is then arranged subsequent to the HARQ-ACK codebook for unicast, or vice versa.

In an embodiment, the HARQ-ACK codebook may be statically generated, that is, generated by the detection timing of the control channel and time-domain scheduling configuration information, or dynamically generated, that is, generated by scheduling counting, which is not limited herein.

In addition, the design of the preset window is supplemented here.

First, the start reference position of the preset window may also be the slot in which the PUCCH resource indicated by the unicast scheduling signaling is located, and the length of the preset window is the number of N slots shifted forward from the start reference position, and N is a positive integer greater than or equal to 1.

Second, in the setting of the preset window, the start position of the window is dynamically determined according to scheduling. For example, the start reference position of the preset window is a position at which the end time of the PDSCH scheduled by the broadcast multicast offsets backward by d time units. Here, the d time units are greater than or equal to a sum of a processing time at which the terminal receives PDSCH scheduled by the broadcast multicast and a time for multiplexing the first HARQ-ACK codebook. Assuming that the time for the terminal to receive broadcast multicast data and HARQ-ACK multiplexing is d symbol, and in the PDSCH scheduled by broadcast multicast, the end time is slot n+5, then slot n+8 subsequent to slot n+5 is used as the start time point of the preset window.

In this case, slot offset from the PDSCH end time is set as the start position, which is beneficial for the terminal to feed back the broadcast multicast HARQ-ACK information to the base station as soon as possible. Thus, the service transmission delay is reduced.

In addition, in the length of the preset window, if no unicast PUCCH satisfies the multiplexing condition, the following method can be adopted: the terminal does not feedback the HARQ-ACK information for the broadcast multicast; HARQ-ACK information is fed back on the PUCCH resource indicated by broadcast multicast scheduling signaling. The foregoing manner may be determined through an agreement or indicated through a centralization, which will not be limited herein.

In addition, in the length of the preset window, when there are multiple unicast PUCCHs that satisfy the multiplexing condition, the following method may be adopted: the first HARQ-ACK codebook is multiplexed on the uplink resource closest to the start reference position of the preset window; or the first HARQ-ACK codebook is multiplexed on the first uplink resource within the preset window. The foregoing manner may be determined through an agreement or indicated through a centralization, which will not be limited herein.

Embodiment 2

The HARQ-ACK feedback process in the present embodiment includes the following steps:

In step 1, the terminal receives broadcast multicast scheduling signaling transmitted by the base station.

The broadcast multicast scheduling signaling in this step may be traditional broadcast multicast scheduling signaling, which will not be repeated here.

In step 2, the terminal receives periodic PUCCH or PUSCH resource information configured by the base station through higher layer signaling, and the relevant information includes: PUSCH or PUCCH periodicity ENUMERATED {slot1, slot2, slot4, slot 8, slot 16}, the values include 1 slot, 2 slots, 4 slots, etc.; PUSCH or PUCCH slot offset value (timeDomainOffset) INTEGER (0 . . . 5119).

It is assumed that the information periodicity of the PUCCH resource or the PUSCH resource is 4 slots and the offset is 0 slot through configuration, that is, there are corresponding PUCCH or PUSCH configurations on uplink slots 0, 4, 8, 12 . . . .

In step 3, the terminal multiplexes, when it is detected that a preset condition is satisfied, a first HARQ-ACK codebook corresponding to the broadcast multicast scheduling signaling on the uplink resource configured by the higher layer.

In an embodiment, the preset condition is that both a HARQ-ACK feedback slot indicated by the broadcast multicast scheduling signaling and a slot in which the uplink resource is located exist in a preset window.

Figure 4:
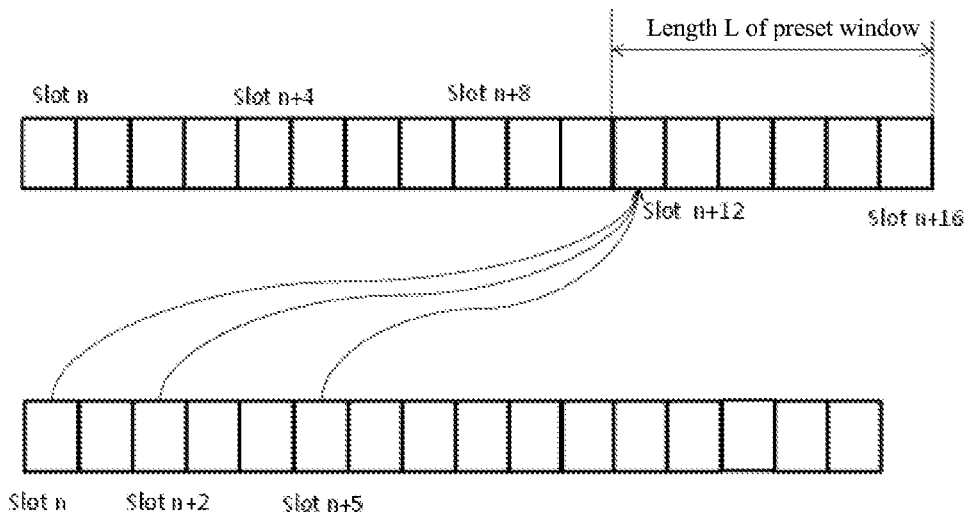
FIG. 4 is a schematic diagram corresponding to a second embodiment of the present application.

The process of determining whether the preset condition is satisfied is as follows: firstly, obtaining the configuration information of the preset window, including the start position and a start position offset of the preset window, and a length of the preset window. In addition, the terminal and the base station can determine the configuration information of the preset window by default through an interface protocol, or the base station can configure the configuration information to the terminal through higher layer signaling. The terminal then calculates a position of the HARQ-ACK feedback slot indicated by the broadcast multicast scheduling signaling. Finally, it is determined whether there is an uplink resource within the preset window. Then, the slot position of the HARQ-ACK feedback corresponding to the broadcast multicast scheduling (that is, the slot position of the PUCCH resource) is calculated through the periodic uplink resource information configured by the broadcast multicast scheduling signaling and the unicast higher layer signaling. Then, it is determined whether the preset window contains an uplink resource configured by a higher layer, and if so, it is considered that the preset condition is satisfied. For example, as shown in FIG. 4, it is assumed that the start position offset of the preset window is 0, the length L=6, and the start reference position is a position of the HARQ-ACK feedback slot indicated by the broadcast multicast scheduling signaling, the HARQ-ACK feedback slot indicated by the broadcast multicast scheduling signaling is slot n+11 and slot n+12 and slot n+16 among from slot n+11 to slot n+16 contain PUCCH or PUSCH resources configured by the higher layer and thus the condition that the uplink resource is within the preset window is satisfied.

When the condition is satisfied, the HARQ-ACK codebook for broadcast multicast is multiplexed on the PUCCH or PUSCH resource configured by the higher layer. Two HARQ-ACK codebooks, including a first HARQ-ACK codebook for broadcast multicast and a second HARQ-ACK codebook for unicast, are carried in the PUCCH or PUSCH resource. The order in which the first HARQ-ACK codebook and the second HARQ-ACK codebook are arranged is the same as that in the first embodiment and will not be repeated here.

In addition, the design of the preset window is supplemented here.

The start reference position of the preset window may also be the slot in which one of the periodic uplink resources configured by the base station is located, and the length of the preset window is the number of M slots shifted forward with the start reference position as a start point, and M is a positive integer greater than or equal to 1.

In addition, in the length of the preset window, if no unicast PUCCH satisfies the multiplexing condition, the following method can be adopted: the terminal does not feedback the HARQ-ACK information for the broadcast multicast; HARQ-ACK information is fed back on the PUCCH resource indicated by broadcast multicast scheduling signaling. The foregoing manner may be determined through an agreement or indicated through a centralization, which will not be limited herein.

In addition, in the length of the preset window, when there are multiple unicast PUCCHs that satisfy the multiplexing condition, the following method may be adopted: the first HARQ-ACK codebook is multiplexed on the uplink resource closest to the start reference position of the preset window; or the first HARQ-ACK codebook is multiplexed on the first uplink resource within the preset window. The foregoing manner may be determined through an agreement or indicated through a centralization, which will not be limited herein.

Embodiment 3

The HARQ-ACK feedback process in the present embodiment includes the following steps.

In step 1, the terminal receives broadcast multicast scheduling signaling transmitted by the base station.

A request message is newly added in the first DCI of the broadcast multicast scheduling signaling and includes a first indication field and identification information of the first HARQ-ACK codebook. In this case, cells of the first DCI are represented as follows:
- frequency domain resource allocation indicator—L bits, used for indicating the frequency domain bandwidth and location of the scheduled PDSCH, and the number of occupied bit widths is related to the total schedulable maximum bandwidth;
- time domain resource allocation indicator—4 bits, used for indicating a time domain in which PDSCH is scheduled;
- modulation and coding format—5 bits, used for indicating the modulation order and channel coding rate adopted by PDSCH;
- redundant coding version—2 bits, which is the redundant version number for data transmission, used for channel decoding and demodulation;
- new data indicator—1 bit, indicating whether the data packet is transmitted for the first time or retransmitted;
- HARQ process ID—4 bits, indicating an ID of HARQ retransmission process;
- PUCCH power control command—2 bits, used for power control when the terminal transmits PUCCH;
- PUCCH resource indicator—3 bits, indicating the PUCCH resource indicator for HARQ-ACK feedback;
- PDSCH to HARQ feedback time indicator—3 bits, indicating the timing of HARQ-ACK feedback, and being slot from PDSCH start to HARQ-ACK feedback;
- first indication field indicating the terminal whether to wait for the information carried in the unicast scheduling signaling—1 bit: when the bit value is 0, it means waiting, and when the bit value is 1, it means not waiting, or vice versa, this field is the newly added field;
- identification number of the HARQ-ACK codebook—A bit, the identification information of the HARQ-ACK codebook carried during unicast scheduling, where A can be 2. This field is the content of the newly added field.

In addition, the broadcast multicast scheduling signaling including the first indication field in the request message indicating the terminal waits for the information carried in the unicast scheduling signaling can also be referred to as a specific broadcast multicast scheduling signaling.

Further, as for the content of the newly added field, the information bits thereof may be a new extension based on the traditional DCI, or the original bit information may be used. That is, the request message is carried in the first DCI by newly adding an indication meaning for the request message to the original field in the first DCI. For example, 2 bits of the "PUCCH power control command" are used for indicating the identification information of the first HARQ-ACK codebook and the PUCCH power control command is invalid in broadcast multicast and can be used as reserved bits. The number of bits used in the modulation and coding format of 5 bits is decreased by 1 bit, that is, the modulation and coding format becomes 4 bits and the decreased 1 bit is used for indicating "the terminal whether to wait for the information carried in the unicast scheduling signaling" and the reason why 5 bits can be decreased to 4 bits is that the performance requirements of most terminals need to be satisfied based on the situation of broadcast multicast scheduling and thus the code rate and modulation order of the broadcast multicast scheduling will not be too high.

In step 2, the terminal receives unicast scheduling signaling transmitted by the base station.

A response message is newly added in the second DCI of the unicast scheduling signaling and includes the second indication field and the identification information of the first HARQ-ACK codebook. In this case, cells of the first DCI are represented as follows:
- frequency domain resource allocation indicator—L bits, used for indicating the frequency domain bandwidth and location of the scheduled PDSCH, and the number of occupied bit widths is related to the total schedulable maximum bandwidth;
- time domain resource allocation indicator—4 bits, used for indicating a time domain in which PDSCH is scheduled;
- modulation and coding format—5 bits, used for indicating the modulation order and channel coding rate adopted by PDSCH;
- redundant coding version—2 bits, which is the redundant version number for data transmission, used for channel decoding and demodulation;
- new data indicator—1 bit, indicating whether the data packet is transmitted for the first time or retransmitted;
- HARQ process ID—4 bits, indicating an ID of HARQ retransmission process;
- PUCCH resource indicator—3 bits, indicating the PUCCH resource indicator for HARQ-ACK feedback;
- PDSCH to HARQ feedback time indicator—3 bits, indicating the timing of HARQ-ACK feedback, and being slot from PDSCH start to HARQ-ACK feedback;
- a second indication field indicating whether to carry the first HARQ-ACK codebook on the uplink resource—1 bit: when the bit value is 0, it means carrying, and when the bit value is 1, it means not carrying, or vice versa, this field is the newly added field; and
- identification number of the first HARQ-ACK codebook—A bit, used for determining the identification information of the broadcast multicast HARQ-ACK codebook carried during unicast scheduling, where A can be 2, and a total of 4 versions are distinguished, and this field is newly added field.

In addition, the unicast scheduling signaling including the second indication field in the response message indicating to carry the first HARQ-ACK codebook in the uplink resource can also be referred to as specific unicast scheduling signaling.

In step 3, the terminal multiplexes, when it is detected that a preset condition is satisfied, a first HARQ-ACK codebook corresponding to the broadcast multicast scheduling signaling on the uplink resource indicated by the unicast scheduling signaling.

In an embodiment, the preset condition is that both a HARQ-ACK feedback slot indicated by the broadcast multicast scheduling signaling and a slot in which the uplink resource is located exist in a preset window.

The process of determining whether the preset conditions are satisfied is as follows: the configuration information of the preset window is first obtained, and the obtaining process can refer to the embodiment 1, which will not be repeated here. It is assumed here that the start reference position of the preset window is a timing at which the specific broadcast multicast scheduling signaling is received, the start position offset is 0, and the length is from the start reference position to the HARQ-ACK feedback slot indicated by the broadcast multicast scheduling signaling. Then, the terminal calculates the position of the HARQ-ACK feedback slot corresponding to the broadcast multicast scheduling signaling and the slot at which the uplink resource indicated by the unicast scheduling signaling is located. For example, time X is position of the HARQ-ACK feedback slot corresponding to the broadcast multicast scheduling signaling (or as a time position of the PUCCH resource, the time position may be a system time, or expressed as a slot or symbol), the time Y is the position of the HARQ-ACK feedback time corresponding to the unicast scheduling signaling (or as a time position of the PUCCH resource, the time position may be a system time, or expressed as a slot or symbol). Finally, it is determined whether the unicast scheduling signaling, and the uplink resources indicated by the unicast scheduling signaling satisfy the preset condition.

When it is determined whether the preset conditions are satisfied, if both condition 1 and condition 2 are satisfied, it is considered that multiplexing is possible. Condition 1: the specific unicast scheduling signaling is received during the period from a time at which the specific broadcast multicast scheduling signaling is received to "time X-d", parameter d indicates that the specific unicast scheduling signaling is received at the latest, and the value of d is a time at which the terminal completely perform operations of receiving/parsing and multiplexing the scheduling signaling and may be 14 symbols or other values. Condition 2: time Y satisfies the delay requirement of the terminal receiving the broadcast multicast service data, that is, the terminal can complete reception of the last broadcast multicast service data and HARQ-ACK multiplexing.

Figure 5:
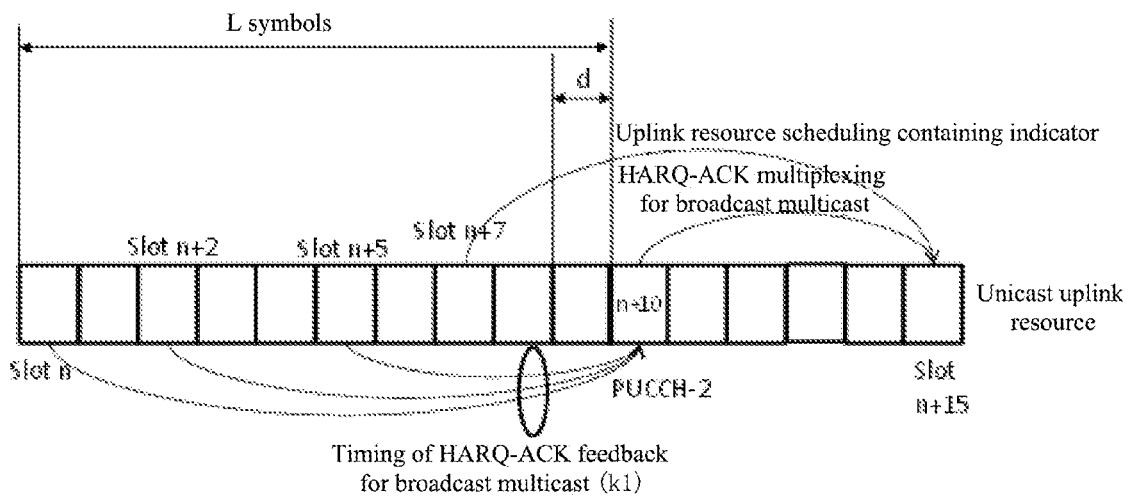
FIG. 5 is a schematic diagram corresponding to a third embodiment of the present application.

In addition, the above two conditions can also be described as follows: the terminal does not multiplex the HARQ-ACK for broadcast multicast on the uplink resource scheduled by the unicast signaling in case that the specific unicast scheduling signaling is received within d symbols previous to the uplink PUCCH resource indicated by the broadcast multicast signaling or the HARQ-ACK feedback resource PUCCH indicated by the broadcast multicast scheduling signaling does not meet the reception-processing time of the broadcast multicast service data. For example, as shown in FIG. 5, a specific broadcast multicast scheduling signaling is received at slot n, and the scheduling information indicates a location of HARQ-ACK feedback for broadcast multicast is at slot n+10. The terminal receives a specific unicast scheduling signaling at slot n+7, a time interval between slot n+7 and slot n+10 meets the requirement of d, and the uplink feedback resource indicated by the unicast scheduling signaling is at slot n+15, which satisfies a minimum time requirement for the terminal to complete reception of the broadcast multicast service data and HARQ-ACK multiplexing. Based on the above determination, the terminal can multiplex the HARQ-ACK feedback for broadcast multicast to the uplink resource scheduled by the unicast.

The remaining process after the preset condition is satisfied refers to that of the first embodiment, and details are not repeated here.

Embodiment 4

The HARQ-ACK feedback process in the present embodiment includes the following steps.

In step 1, the terminal receives broadcast multicast scheduling signaling transmitted by the base station.

This step is the same as the step 1 in the embodiment 3, and will not be repeated here.

In step 2, a response message is newly added in the second DCI of the unicast scheduling signaling and includes K-bit carrying-identified bitmap. In this case, cells of the first DCI are represented as follows:

frequency domain resource allocation indicator—L bits, used for indicating the frequency domain bandwidth and location of the scheduled PDSCH, and the number of occupied bit widths is related to the total schedulable maximum bandwidth;

time domain resource allocation indicator—4 bits, used for indicating a time domain in which PDSCH is scheduled;

modulation and coding format—5 bits, used for indicating the modulation order and channel coding rate adopted by PDSCH;

redundant coding version—2 bits, which is the redundant version number for data transmission, used for channel decoding and demodulation;

new data indicator—1 bit, indicating whether the data packet is transmitted for the first time or retransmitted;

HARQ process ID—4 bits, indicating an ID of HARQ retransmission process; PUCCH resource indicator—3 bits, indicating the PUCCH resource indicator for HARQ-ACK feedback;

PDSCH to HARQ feedback time indicator—3 bits, indicating the timing of HARQ-ACK feedback, and being slot from PDSCH start to HARQ-ACK feedback;

carrying-identified bitmap—K bits, X being the maximum number of codebooks for broadcast multicast, a corresponding bit value of 0 means that the codebook is carried, a corresponding bit value of 1 means no codebook is carried, or vice versa; this field is newly added.

For example, the terminal, before slot n+13, receives broadcast multicast that feeds back four HARQ-ACK codebooks, which are codebook 0, codebook 1, codebook 2, and codebook 3, respectively. The terminal, on slot n+7 within some windows for scheduling codebooks, detects the uplink unicast scheduling signaling, and the codebook bitmap carried by the signaling indication is indicated as 1100, which means that the unicast scheduling carries the HARQ-ACK information of codebook 2 and codebook 3 and does not carry HARQ-ACK information of codebook 0 and codebook 1.

In addition, the unicast scheduling signaling containing the carrying-identified bitmap may be referred to as a specific unicast scheduling signaling.

In step 3, the terminal multiplexes, when it is detected that a preset condition is satisfied, a first HARQ-ACK codebook corresponding to the broadcast multicast scheduling signaling on the uplink resource indicated by the unicast scheduling signaling.

In an embodiment, the preset condition is that both a HARQ-ACK feedback slot indicated by the broadcast multicast scheduling signaling and a slot in which the uplink resource is located exist in a preset window.

The process of determining whether the preset condition is satisfied is as follows. The configuration information of the preset window is first obtained, and the obtaining process can refer to embodiment 3, which will not be repeated here. Then, for each codebook, it is determined whether the preset condition is satisfied. When it is determined that whether the preset conditions are satisfied, it is considered that multiplexing is possible when both condition 1 and condition 2 are satisfied. Condition 1: the identification information corresponding to the HARQ-ACK codebook, and the corresponding indication in the carrying-identified bitmap is carrying. Condition 2: the uplink resource time of unicast scheduling meets the processing time for the terminal to receive broadcast multicast data, that is, the terminal can complete the corresponding demodulating and decoding before multiplexing the HARQ-ACK of the broadcast multicast data to the uplink resources. In other words, condition 2 may be described as follows: the terminal does not multiplex the HARQ-ACK for broadcast multicast on the uplink resource scheduled by the unicast signaling in case that the HARQ-ACK feedback resource PUCCH indicated by the specific unicast scheduling signaling does not meet the reception-processing time of the broadcast multicast service data.

The remaining process after the preset condition is satisfied refers to that of the first embodiment, and details are not repeated here.

It should be noted here that the preset window in embodiments 3 and 4 may be replaced with a timer, and the duration of the timer is the time corresponding to the preset window. In this case, when the timer is overtime and no valid unicast scheduling signaling is received, the terminal discards the HARQ-ACK codebook information for broadcast multicast or transmits it on the uplink resource indicated by the broadcast multicast. If valid unicast scheduling signaling is received before the timer is overtime, the terminal stops the timer, and multiplexes the HARQ-ACK codebook for broadcast multicast on the uplink resource scheduled by the unicast scheduling signaling. If a new broadcast multicast scheduling signaling (including carrying indication) before the timer is overtime and the HARQ-ACK codebooks are the same, the terminal re-multiplexes the timer.

Embodiment 5

In embodiments 1, 2, 3 and 4, it is assumed that there is an order in which a unicast HARQ-ACK codebook and a broadcast multicast HARQ-ACK codebook are multiplexed. The multiplexing processing method when there are 2 HARQ-ACK codebook for unicast and multiple HARQ-ACK codebooks for multicast broadcast is discussed in the present embodiment.

Figure 6:
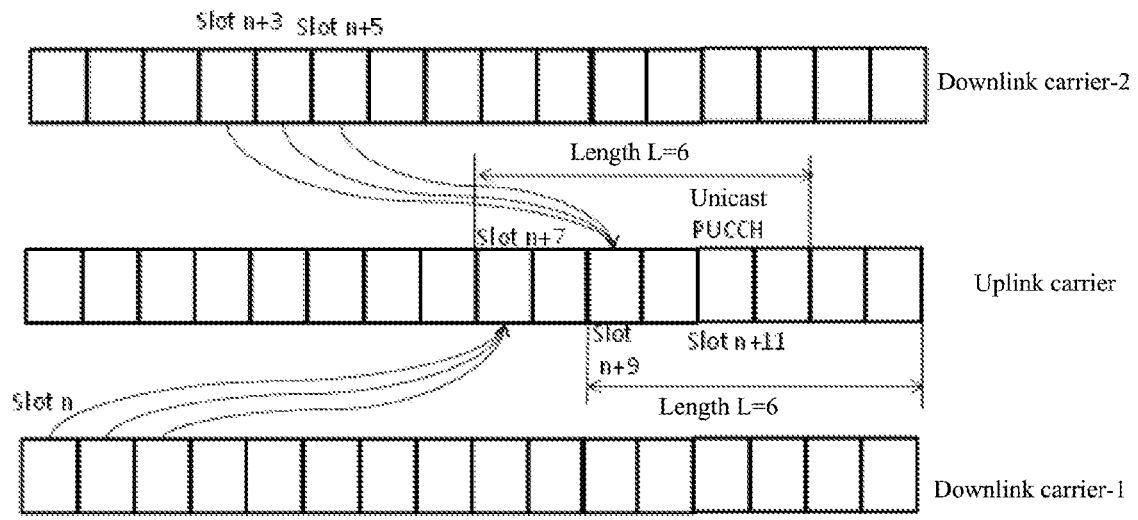
FIG. 6 is a schematic diagram corresponding to a fifth embodiment of the present application.

In occasion 1, there are 0 HARQ-ACK codebooks for unicast and multiple HARQ-ACK codebooks for broadcast multicast:

A possible occasion in which multiple HARQ-ACK codebooks for broadcast multicast exist is that the base station transmits multiple broadcast multicast services, and different broadcast multicast services use different codebooks. According to the method of setting the preset window, the codebooks for different broadcast multicast services correspond to the same uplink resource (PUCCH or PUSCH). As shown in FIG. 6, the data (3 transport blocks) in the broadcast multicast service 1 is scheduled and indicated to feed back HARQ-ACK on slot n+7, and the fed back HARQ-ACK codebook 1 contains 3 bits. The data (3 transport blocks) in the broadcast multicast service 2 is scheduled and indicated to feed back HARQ-ACK on slot n+9, and the fed back HARQ-ACK codebook 1 contains 3 bits. The lengths of the preset windows set for the two broadcast multicast services are both 6, and the uplink PUCCH resources in the slot n+11 are both multiplexing resources of the data in the two broadcast multicast services.

When multiple broadcast multicast HARQ codebooks are multiplexed on one uplink PUCCH or PUSCH resource, the multiplexing order is one of the following orders:

1. a sequential order of a first HARQ-ACK feedback time indicated by each broadcast multicast scheduling signaling: the HARQ-ACK codebook is arranged ahead when the start time for an uplink feedback resource is previous; the HARQ-ACK codebook with a smaller carrier number is arranged ahead in the ascending order of the carrier numbers as the priority if the start times for uplink feedback resources are the same; and the HARQ-ACK codebook with a smaller broadcast multicast service number is arranged ahead in the ascending order of the broadcast multicast service numbers as the priority if the start times for uplink feedback resources are the same and the carrier numbers are same; The service number here may be a temporary mobile group identify (MGI), a dynamic scheduling group radio network temporary identity (G-RNTI), or other identification numbers that characterize broadcast multicast service identity; and 2. an index order of the first HARQ-ACK codebook indicated by each broadcast multicast scheduling signaling: in an ascending order of the indexes of codebooks, for example, the codebook with a smaller index is arranged ahead and the codebook with a greater index is arranged behind, the arrangement order is codebook 0, codebook 1, and codebook 2; or in a descending order of the indexes of the codebooks, for example, the codebook with a greater index is arranged ahead and the codebook with a smaller index is arranged behind and the arrangement order is codebook 2, codebook 1, and codebook 0. The above-mentioned ordering method can be specified by the method of the interface protocol, and can also be notified to the terminal by the higher layer protocol.

In occasion 2, there are 1 HARQ-ACK codebooks for unicast and multiple HARQ-ACK codebooks for broadcast multicast:

when the uplink resource PUCCH/PUSCH carries one or more HARQ-ACK codebooks for broadcast multicast, the HARQ codebooks may be arranged in one of the following orders: the HARQ-ACK codebook for unicast is arranged prior to the HARQ-ACK codebook for broadcast multicast; the HARQ-ACK codebook for broadcast multicast is arranged prior to the HARQ-ACK codebook for unicast; the HARQ-ACK codebook for broadcast multicast is arranged prior to the HARQ-ACK codebook for unicast if the PUCCH resource indicated by the broadcast multicast is prior to the PUCCH indicated by the unicast, otherwise the HARQ-ACK codebook for broadcast multicast is arranged subsequent to the HARQ-ACK codebook for unicast. The above-mentioned ordering method can be specified by the method of the interface protocol, and can also be notified to the terminal by the higher layer protocol.

Embodiment 6

The base station configures a number corresponding to the HARQ-ACK codebook when configuring the G-RNTI for broadcast multicast. The base station configures multiple different numbers of HARQ-ACK codebook when configuring multiple G-RNTIs for broadcast multicast (for example, the corresponding HARQ-ACK codes are configured for N G-RNTIs among M G-RNTIs, M>=N). The numbers of the HARQ-ACK codebooks are arranged in increasing order to form a table. The relationship between "carrying-identified number" or "carrying-identified bitmap" in unicast scheduling signaling and the numbers of HARQ-ACK codebooks configured by higher layer can be shown in the following table.

| Carrying-identified number | Numbers of HARQ-ACK codebooks configured by higher layer |
| --- | --- |
| 0 | smallest number of HARQ-ACK codebook configured by higher layer |
| 1 | second-smallest number of HARQ-ACK codebook configured by higher layer |
| 2 | third-smallest number of HARQ-ACK codebook configured by higher layer |
| 3 | fourth-smallest number of HARQ-ACK codebook configured by higher layer |

In the present application, by multiplexing the HARQ-ACK codebook for broadcast multicast on the unicast uplink resource among the above-mentioned various embodiments, the protocol design and complexity of HARQ-ACK feedback for broadcast multicast is simplified and the problem that the terminal requires different formats for PUCCH in different locations of the cell can be effectively solved.

Figure 7:
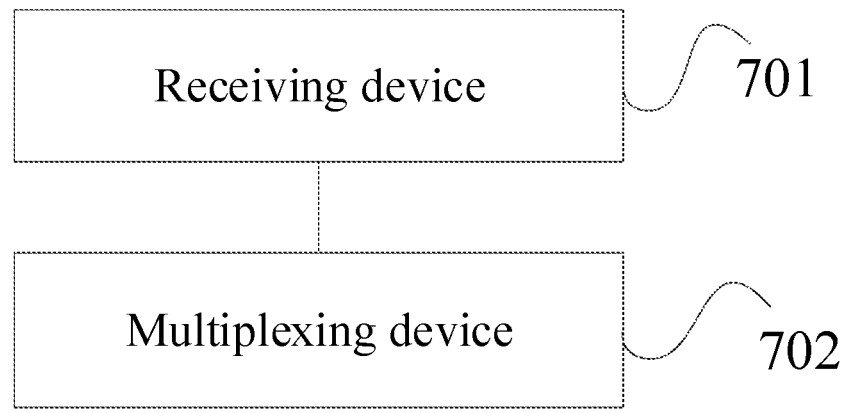
FIG. 7 is a device diagram of a HARQ-ACK feedback device applied to a terminal according to an embodiment of the present application.

FIG. 7 is a device diagram of a HARQ-ACK feedback device applied to a terminal according to an embodiment of the present application. The device includes:

a receiving device 701, configured to receive the broadcast multicast scheduling signaling transmitted by a base station, and determine an uplink resource corresponding to unicast; and a multiplexing device 702, configured to multiplex, when it is detected that a preset condition is satisfied, a first HARQ-ACK codebook corresponding to the broadcast multicast scheduling signaling on the uplink resource corresponding to unicast, the preset condition being that both a HARQ-ACK feedback slot indicated by the broadcast multicast scheduling signaling and a slot in which the uplink resource is located exist in a preset window.

The device according to the present embodiment may perform all the method steps that can be implemented by the above-mentioned terminal-side method embodiments, and can provide the same effect, which is not repeated here.

Figure 8:
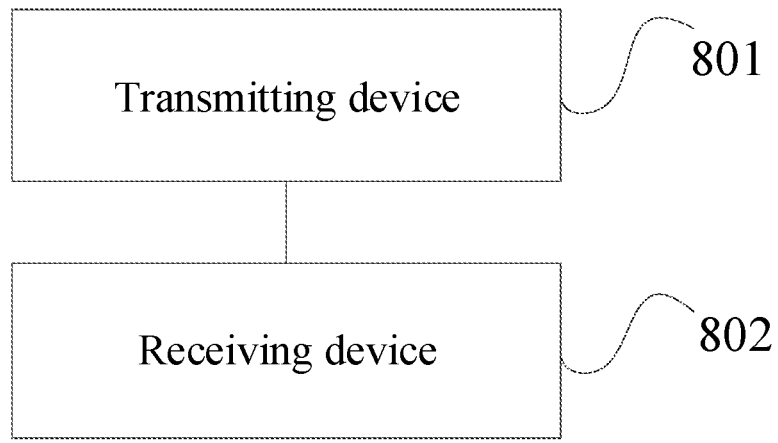
FIG. 8 is a device diagram of a HARQ-ACK feedback device applied to a base station according to an embodiment of the present application.

FIG. 8 is a device diagram of a HARQ-ACK feedback device applied to a base station according to an embodiment of the present application and the device includes:

a transmitting device 801, configured to transmit broadcast multicast scheduling signaling to a terminal for indicating the terminal to multiplex, when it is detected that a preset condition is satisfied, a first HARQ-ACK codebook corresponding to the broadcast multicast scheduling signaling on the uplink resource corresponding to unicast, the preset condition being that both a HARQ-ACK feedback slot indicated by the broadcast multicast scheduling signaling and a slot in which the uplink resource is located exist in a preset window; and a receiving device 802, configured to receive uplink data transmitted by the terminal through the uplink resource when the preset condition is satisfied, and obtain a first HARQ-ACK codebook multiplexed on the uplink resource.

The device according to the present embodiment may perform all the method steps that can be implemented by the above-mentioned base station-side method embodiments, and can provide the same effect, which is not repeated here.

Figure 9:
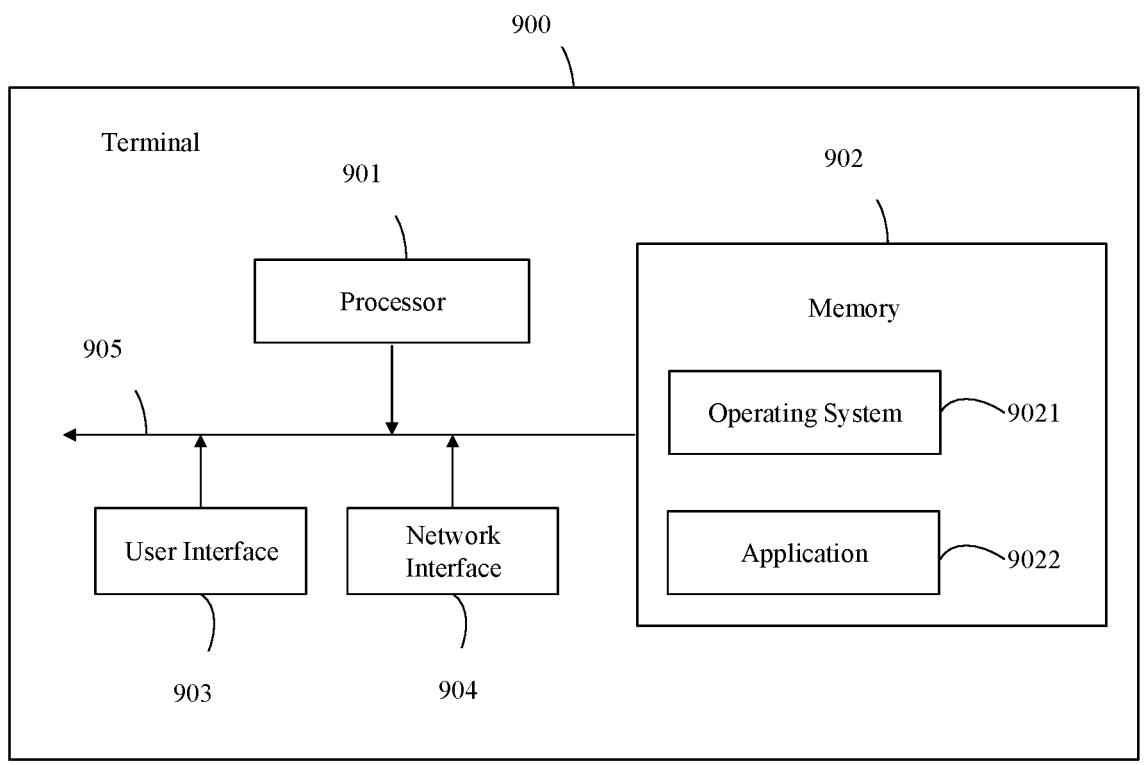
FIG. 9 is a schematic structural diagram of a terminal according to an embodiment of the present application.

FIG. 9 is a schematic structural diagram of a terminal according to an embodiment of the present application. As shown in FIG. 9, the terminal may include at least one processor 901, a memory 902, at least one network interface 904, and other user interfaces 903. Respective components in the terminal 900 are coupled together through the bus system 905. It is understood that the bus system 905 is used to connect and communicate between these components. In addition to the data bus, the bus system 905 also includes a power bus, a control bus, and a status signal bus. For clarity of illustration, the various buses are labeled as bus system 905 in FIG. 9.

The user interface 903 may include a display, a keyboard or a pointing device, such as a mouse, a trackball, a touch pad or a touch screen, and the like.

It is to be understood that the memory 902 in the embodiments of the present application may be volatile memory or non-volatile memory, or may include both volatile and non-volatile memory. The non-volatile memory may be read-only memory (ROM), programmable read-only memory (PROM), erasable programmable read-only memory (Erasable PROM, EPROM), erase programmable read-only memory (Electrically EPROM, EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchronous link dynamic random access memory (synchlink DRAM, SLDRAM) and direct memory bus random access memory (Direct Rambus RAM, DRRAM). The memory 902 in systems and methods described in various embodiments of the present application includes, but not limited to, these and any other suitable types of memory.

In some embodiments, the memory 902 stores the following elements, executable devices or data structures, or a subset thereof, or an extended set of them, such as an operating system 9021 and applications 9022.

The operating system 9021 includes various system programs, such as a framework layer, a core library layer, a driver layer, etc., for implementing various basic services and processing hardware-based tasks. The application 9022 includes various applications, such as a media player, a browser, etc., for implementing various application services. The programs for performing methods according to the embodiment of the present application may be included in the application 9022.

In the embodiment of the present application, by calling the computer program or instruction stored in the memory 902, such as the computer program or instruction stored in the application 9022, the processor 901 is configured to: receive the broadcast multicast scheduling signaling transmitted by a base station, and determine an uplink resource corresponding to unicast; multiplex, when it is detected that a preset condition is satisfied, a first HARQ-ACK codebook corresponding to the broadcast multicast scheduling signaling onto the uplink resource corresponding to unicast, the preset condition is that both a HARQ-ACK feedback slot indicated by the broadcast multicast scheduling signaling and a slot in which the uplink resource is located exist in a preset window.

The methods disclosed in the above embodiments of the present application may be applied to the processor 901 or implemented by the processor 901. The processor 901 may be an integrated circuit chip with signal processing capability. In the implementation process, each step of the above-mentioned method can be completed by an integrated logic circuit of hardware in the processor 901 or an instruction in the form of software. The above-mentioned processor 901 may be a general-purpose processor, a digital signal processor (DSP), an application specific integrated circuit (ASIC), a field programmable gate array (FPGA) or other programmable logic devices, discrete gate or transistor logic devices, discrete hardware components, which can implement or execute the disclosed methods, steps and logical block diagrams in the embodiments of the present application. A general purpose processor may be a microprocessor or the processor may be any conventional processor or the like. The steps of the methods disclosed in conjunction with the embodiments of the present application may be directly embodied as being executed by a hardware decoding processor, or being executed by a combination of hardware and software modules in the decoding processor. The software module can be located in random access memory, flash memory, read-only memory, programmable read-only memory or electrically erasable programmable memory, registers and other storage media mature in the art. The storage medium is located in the memory 902, and the processor 901 reads the information in the memory 902, and completes the steps of the above method in combination with its hardware.

It will be appreciated that the embodiments described in this disclosure may be implemented in hardware, software, firmware, middleware, microcode, or a combination thereof. For hardware implementation, the processing unit may be implemented in one or more application specific integrated circuits (ASIC), digital signal processing (DSP), digital signal processing device (DSP Device, DSPD), programmable logic device (PLD), field-programmable gate array (FPGA), a general-purpose processor, a controller, microcontroller, microprocessor, and other for performing the functions described in this application electronic unit or a combination thereof.

For software implementation, the described techniques may be implemented through modules (for example, procedures, functions, etc.) that perform the functions described in the embodiments of the present application. Software codes may be stored in memory and executed by a processor. The memory can be implemented in the processor or external to the processor.

In another embodiment, the processor 901 is further configured to: receive the unicast scheduling signaling transmitted by the base station when determining the uplink resource corresponding to the unicast, where the unicast scheduling signaling carries scheduling information for the uplink resource; or receive periodic uplink resource information configured by the base station through higher layer signaling, and determine the uplink resource corresponding to unicast based on the periodic uplink resource information, where the periodic uplink resource information includes a transmission period and slot offset of the uplink resource, and the uplink resource is a physical uplink control channel (PUCCH) resource or a physical uplink shared channel (PUSCH) resource.

In yet another embodiment, when the uplink resource is a resource scheduled by the unicast scheduling signaling and used for transmitting unicast HARQ-ACK information, the preset condition further includes that a time for receiving the unicast scheduling signaling is previous to the HARQ-ACK feedback slot indicated by the broadcast multicast scheduling signaling and has an interval of X or more symbols away from the HARQ-ACK feedback slot and the slot in which the uplink resource is located meets a reception-processing time of the service data corresponding to the broadcast multicast scheduling signaling; and a value of X is a sum of a processing time for receiving the unicast scheduling signaling by the terminal and a time for multiplexing the first HARQ-ACK codebook corresponding to the broadcast multicast scheduling signaling.

In still yet another embodiment, the first downlink control information (DCI) corresponding to the broadcast multicast scheduling signaling includes a request message used for indicating the terminal whether to wait for information carried in the unicast scheduling signaling, the carried information includes indication information for indicating whether to carry the first HARQ-ACK codebook in the uplink resource; a second DCI corresponding to the unicast scheduling signaling includes a response message used for indicating whether to carry the first HARQ-ACK codebook in the uplink resource.

In still yet another embodiment, the request message includes a first indication field and identification information of the first HARQ-ACK codebook. The first indication field is used for indicating the terminal whether to wait for the information carried in the unicast scheduling signaling, a new field with a request message is added in the first DCI, or an original field in the first DCI is used by an indication meaning for the request message. The response message includes a second indication field and the identification information of the first HARQ-ACK codebook. The second indication field is used for indicating whether to carry the first HARQ-ACK codebook in the uplink resource, a new field with a response message is added in the second DCI, or an original field in the second DCI is used by an indication meaning for the response message, where there is a correspondence between the identification information of each HARQ-ACK codebook and the codebook number of the HARQ-ACK.

In still yet another embodiment, the response message includes a K bits carrying-identified bitmap, where K represents the maximum number of HARQ-ACK codebooks for broadcast multicast, and when the value of the bit is a first preset value, it means that the corresponding HARQ-ACK codebook is carried and when the value of the bit is a second preset value, it means that no corresponding HARQ-ACK codebook is carried.

In still yet another embodiment, the processor is further configured to obtain the configuration information of the preset window predefined by a protocol; or receive the configuration information of the preset window sent by the base station through higher layer signaling, where the configuration information includes a start reference position, a start position offset of the preset window and a length of the preset window.

In still yet another embodiment, the start reference position of the preset window includes any one of the following:
  a position of the HARQ-ACK feedback slot indicated by the broadcast multicast scheduling signaling; or
  a slot in which the PUCCH resource indicated by the unicast scheduling signaling is located; or
  an end time of the physical downlink shared channel (PDSCH) corresponding to the broadcast multicast scheduling signaling; or
  a slot in which one of the periodic uplink resources configured by the base station is located; or
  a time for receiving broadcast multicast scheduling signaling.

The start position offset and/or the length of the preset window satisfies any of the following:
  the start position offset of the preset window is a positive value, a negative value, or 0 when the start reference position is a position of the HARQ-ACK feedback slot indicated by the broadcast multicast scheduling signaling or a position of the slot in which the PUCCH resource indicated by the unicast scheduling signaling is located, a length of the preset window is one slot; or
  the start position offset is d when the start reference position is an end time of the PDSCH corresponding to the broadcast multicast scheduling signaling, where d is greater than or equal to the sum of a processing time for receiving PDSCH by the terminal and a time for multiplexing the first HARQ-ACK codebook corresponding to the broadcast multicast scheduling signaling; or
  the start position offset is a negative value when the start reference position is a slot in which one of the periodic uplink resources configured by the base station is located; or
  the start position offset is a positive value or 0 when the start reference position is a time for receiving the broadcast multicast scheduling signaling, and the length of the preset window is from the start position to a position of the HARQ-ACK feedback slot indicated by the broadcast multicast scheduling signaling.

In still yet another embodiment, when the first HARQ-ACK codebook corresponding to the broadcast multicast scheduling signaling is multiplexed on the uplink resource corresponding to the unicast, the order in which the first HARQ-ACK codebook and a second HARQ-ACK codebook that is already in the uplink resource are arranged in the uplink resource satisfies one of the following cases:
  the first HARQ-ACK codebook is arranged previous to the second HARQ-ACK codebook;
  the first HARQ-ACK codebook is arranged subsequent to the second HARQ-ACK codebook; the first and second HARQ-ACK codebooks are arranged in a sequential order of the PUCCH resource corresponding to the first HARQ-ACK codebook before multiplexing and the PUCCH resource corresponding to the second HARQ-ACK codebook; or
  the first and second HARQ-ACK codebooks are arranged in a receiving order of the broadcast multicast scheduling signaling and the unicast scheduling signaling.

In still yet another embodiment, when the number of the broadcast multicast scheduling signaling is two or more, and two or more first HARQ-ACK codebooks corresponding to the two or more broadcast multicast scheduling signaling are multiplexed on the uplink resources, two or more first HARQ-ACK codebooks may be arranged on the uplink resources in one of the following orders: a sequential order of a first HARQ-ACK feedback time indicated by each broadcast multicast scheduling signaling, the two or more first HARQ-ACK codebooks being arranged in an ascending order of numbers of carriers when the first HARQ-ACK feedback times indicated by the two or more broadcast multicast scheduling signaling are the same and the two or more first HARQ-ACK codebooks being arranged in an ascending order of indexes of broadcast multicast services when the first HARQ-ACK feedback times indicated by the two or more broadcast multicast scheduling signaling are the same and the numbers of carriers are the same; or an index order of the first HARQ-ACK codebooks indicated by each broadcast multicast scheduling signaling.

In still yet another embodiment, the processor 901 is further configured to: skip feeding back HARQ-ACK information indicated by the broadcast multicast scheduling signaling or feedback HARQ-ACK information on a PUCCH resource indicated by the broadcast multicast scheduling signaling In still yet another embodiment, when the first HARQ-ACK codebook corresponding to the broadcast multicast scheduling signaling is multiplexed onto the uplink resources corresponding to unicast in case that the number of uplink resources is two or more, the processor 901 is further configured to: multiplex the first HARQ-ACK codebook on the uplink resource closest to the start reference position of the preset window; or, multiplex the first HARQ-ACK codebook on the first uplink resource in the preset window.

The terminal according to the embodiments of the present application can perform each process implemented by the terminal in the foregoing embodiments, and to avoid repetition, details are not described herein again.

Figure 10:
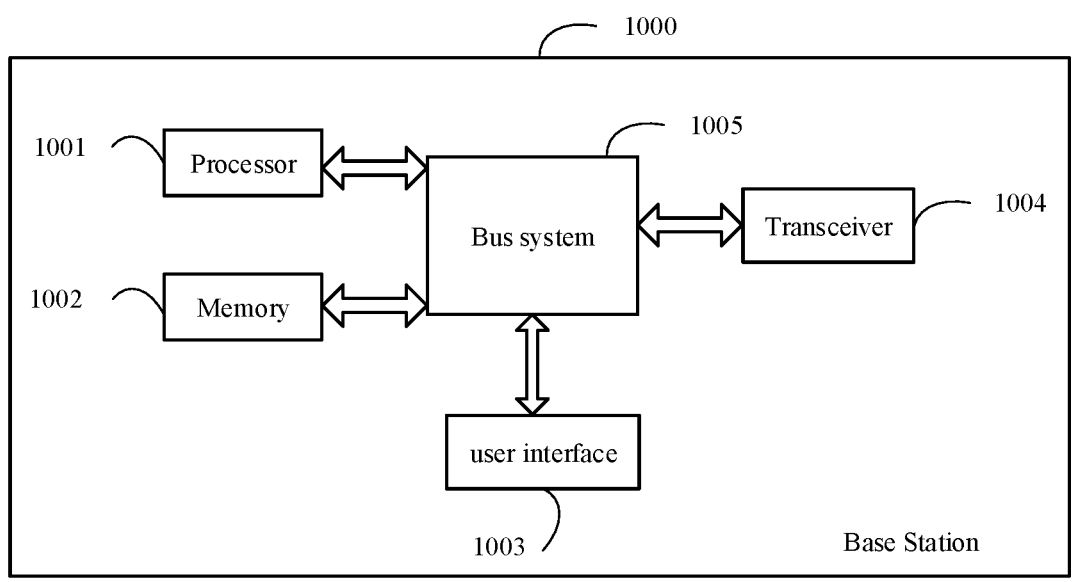
FIG. 10 is a schematic structural diagram of a base station according to an embodiment of the present application.

FIG. 10 is a schematic structural diagram of a base station according to an embodiment of the present application. As shown in FIG. 10, the base station 1000 may include at least one processor 1001, memory 1002, at least one other user interface 1003, and a transceiver 1004. Respective components in the base station 1000 are coupled together through the bus system 1005. It is understood that the bus system 1005 is used to connect and communicate between these components. In addition to the data bus, the bus system 1005 also includes a power bus, a control bus, and a status signal bus. However, for the sake of clarity, in FIG. 10 respective buses are labeled as the bus system 1005, and the bus system may include any number of interconnected buses and bridges, which are linked together through various circuits of one or more processors represented by processor 1001 and one or more memories represented by the memory 1002. The bus system can also link together various other circuits, such as peripherals, voltage regulators, and power management circuits, which are well known in the art, and therefore will not be further described in the embodiments of the present application. The bus interface provides an interface. Transceiver 1004 may be a number of elements, including a transmitter and a receiver, that provide a means for communicating with various other devices over a transmission medium. For different user equipment, the user interface 1003 may also be an interface capable of externally or internally connecting the required equipment, and the connected equipment includes, but not limited to, a keypad, a display, a speaker, a microphone, a joystick, and the like.

It is to be understood that the memory 1002 in the embodiments of the present application may be volatile memory or non-volatile memory, or may include both volatile and non-volatile memory. The non-volatile memory may be read-only memory (ROM), programmable read-only memory (PROM), erasable programmable read-only memory (Erasable PROM, EPROM), erase programmable read-only memory (Electrically EPROM, EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchronous link dynamic random access memory (synchlink DRAM, SLDRAM) and direct memory bus random access memory (Direct Rambus RAM, DRRAM). The memory 1002 in systems and methods described in various embodiments of the present application includes, but not limited to, these and any other suitable types of memory.

The processor 1001 is responsible for managing the bus system and general processing, and the memory 1002 can store computer programs or instructions used by the processor 1001 when performing operations. In an embodiment, the processor 1001 can be configured to: transmit broadcast multicast scheduling signaling to a terminal for indicating the terminal to multiplex, when it is detected that a preset condition is satisfied, a first HARQ-ACK codebook corresponding to the broadcast multicast scheduling signaling on the uplink resource corresponding to unicast, the preset condition being that both a HARQ-ACK feedback slot indicated by the broadcast multicast scheduling signaling and a slot in which the uplink resource is located exist in a preset window; and receive uplink data transmitted by the terminal through the uplink resource when the preset condition is satisfied, and obtain a first HARQ-ACK codebook multiplexed on the uplink resource.

The method steps disclosed in the above embodiments of the present application may be applied to the processor 1001 or implemented by the processor 1001. The processor 1001 may be an integrated circuit chip with signal processing capability. In the implementation process, each step of the above-mentioned method can be completed by an integrated logic circuit of hardware in the processor 1001 or an instruction in the form of software. The above-mentioned processor 1001 may be a general-purpose processor, a digital signal processor (DSP), an application specific integrated circuit (ASIC), a field programmable gate array (FPGA) or other programmable logic devices, discrete gate or transistor logic devices, discrete hardware components, which can implement or execute the disclosed methods, steps and logical block diagrams in the embodiments of the present application. A general purpose processor may be a microprocessor or the processor may be any conventional processor or the like. The steps of the methods disclosed in conjunction with the embodiments of the present application may be directly embodied as being executed by a hardware decoding processor, or being executed by a combination of hardware and software modules in the decoding processor. The software module can be located in random access memory, flash memory, read-only memory, programmable read-only memory or electrically erasable programmable memory, registers and other storage media mature in the art. The storage medium is located in the memory 1002, and the processor 1001 reads the information in the memory 1002, and completes the steps of the above method in combination with its hardware.

It will be appreciated that the embodiments described in this disclosure may be implemented in hardware, software, firmware, middleware, microcode, or a combination thereof. For hardware implementation, the processing unit may be implemented in one or more application specific integrated circuits (ASIC), digital signal processing (DSP), digital signal processing device (DSP Device, DSPD), programmable logic device (PLD), field-programmable gate array (FPGA), a general-purpose processor, a controller, microcontroller, microprocessor, and other for performing the functions described in this application electronic unit or a combination thereof.

For software implementation, the described techniques may be implemented through modules (for example, procedures, functions, etc.) that perform the functions described in the embodiments of the present application. Software codes may be stored in memory and executed by a processor. The memory can be implemented in the processor or external to the processor.

In still yet another embodiment, the processor 1001 is further configured to transmit unicast scheduling signaling to the terminal, where the unicast scheduling signaling carries scheduling information for the uplink resource; or configure periodic uplink resource information to the terminal by higher layer signaling for indicating the terminal to determine the uplink resource corresponding to unicast based on the periodic uplink resource information, where the periodic uplink resource information includes a transmission period and slot offset of the uplink resource, and the uplink resource is a physical unlink control channel (PUCCH) resource or a physical uplink shared channel (PUSCH) resource.

In yet another embodiment, when the uplink resource is a resource scheduled by the unicast scheduling signaling and used for transmitting unicast HARQ-ACK information, the preset condition further includes that a time for receiving the unicast scheduling signaling is previous to the HARQ-ACK feedback slot indicated by the broadcast multicast scheduling signaling and has an interval of X or more symbols away from the HARQ-ACK feedback slot and the slot in which the uplink resource is located meets a reception-processing time of the service data corresponding to the broadcast multicast scheduling signaling; and a value of X is a sum of a processing time for receiving the unicast scheduling signaling by the terminal and a time for multiplexing the first HARQ-ACK codebook corresponding to the broadcast multicast scheduling signaling.

In still yet another embodiment, the first downlink control information (DCI) corresponding to the broadcast multicast scheduling signaling includes a request message used for indicating the terminal whether to wait for information carried in the unicast scheduling signaling, the carried information includes indication information for indicating whether to carry the first HARQ-ACK codebook in the uplink resource; a second DCI corresponding to the unicast scheduling signaling includes a response message used for indicating whether to carry the first HARQ-ACK codebook in the uplink resource.

In still yet another embodiment, the request message includes a first indication field and identification information of the first HARQ-ACK codebook. The first indication field is used for indicating the terminal whether to wait for the information carried in the unicast scheduling signaling, a new field with a request message is added in the first DCI, or an original field in the first DCI is used by an indication meaning for the request message. The response message includes a second indication field and the identification information of the first HARQ-ACK codebook. The second indication field is used for indicating whether to carry the first HARQ-ACK codebook in the uplink resource, a new field with a response message is added in the second DCI, or an original field in the second DCI is used by an indication meaning for the response message, where there is a correspondence between the identification information of each HARQ-ACK codebook and the codebook number of the HARQ-ACK.

In still yet another embodiment, the response message includes a K bits carrying-identified bitmap, where K represents the maximum number of HARQ-ACK codebooks for broadcast multicast, and when the value of a bit is a first preset value, it means that the corresponding HARQ-ACK codebook is carried and when the value of the bit is a second preset value, it means that no corresponding HARQ-ACK codebook is carried.

In still yet another embodiment, the processor 1001 is further configured to obtain the configuration information of the preset window predefined by a protocol; or transmit the configuration information of the preset window to the terminal through higher layer signaling, where the configuration information includes a start reference position, a start position offset of the preset window and a length of the preset window.

In still yet another embodiment, the start reference position of the preset window includes any one of the following:
 a position of the HARQ-ACK feedback slot indicated by the broadcast multicast scheduling signaling; or
 a slot in which the PUCCH resource indicated by the unicast scheduling signaling is located; or
 an end time of the physical downlink shared channel (PDSCH) corresponding to the broadcast multicast scheduling signaling; or
 a slot in which one of the periodic uplink resources configured by the base station is located; or
 a time for receiving broadcast multicast scheduling signaling.

The start position offset and/or the length of the preset window satisfies any of the following:
 the start position offset of the preset window is a positive value, a negative value, or 0 when the start reference position is a position of the HARQ-ACK feedback slot indicated by the broadcast multicast scheduling signaling or a position of the slot in which the PUCCH resource indicated by the unicast scheduling signaling is located, a length of the preset window is one slot; or
 the start position offset is d when the start reference position is an end time of the PDSCH corresponding to the broadcast multicast scheduling signaling, where d is greater than or equal to the sum of a processing time for receiving PDSCH by the terminal and a time for multiplexing the first HARQ-ACK codebook corresponding to the broadcast multicast scheduling signaling; or
 the start position offset is a negative value when the start reference position is a slot in which one of the periodic uplink resources configured by the base station is located; or
 the start position offset is a positive value or 0 when the start reference position is a time for receiving the broadcast multicast scheduling signaling, and the length of the preset window is from the start position to a position of the HARQ-ACK feedback slot indicated by the broadcast multicast scheduling signaling.

In still yet another embodiment, the order in which the first HARQ-ACK codebook and a second HARQ-ACK codebook that is already in the uplink resource are arranged in the uplink resource satisfies one of the following cases:
 the first HARQ-ACK codebook is arranged previous to the second HARQ-ACK codebook, the first HARQ-ACK codebook is arranged subsequent to the second HARQ-ACK codebook, the first and second HARQ-ACK codebooks are arranged in a sequential order of the PUCCH resource corresponding to the first HARQ-ACK codebook before multiplexing and the PUCCH resource corresponding to the second HARQ-ACK codebook; or the first and second HARQ-ACK codebooks are arranged in a receiving order of the broadcast multicast scheduling signaling and the unicast scheduling signaling.

In still yet another embodiment, when the number of the broadcast multicast scheduling signaling is two or more, and two or more first HARQ-ACK codebooks corresponding to the two or more broadcast multicast scheduling signaling are multiplexed on the uplink resources, two or more first HARQ-ACK codebooks are arranged on the uplink resources in one of the following orders:
 a sequential order of a first HARQ-ACK feedback time indicated by each broadcast multicast scheduling signaling, the two or more first HARQ-ACK codebooks being arranged in an ascending order of numbers of carriers when the first HARQ-ACK feedback times indicated by the two or more broadcast multicast scheduling signaling are the same and in an ascending order of indexes of broadcast multicast services when the first HARQ-ACK feedback times indicated by the two or more broadcast multicast scheduling signaling are the same and the numbers of carriers are the same; or in an index order of the first HARQ-ACK codebooks indicated by each broadcast multicast scheduling signaling.

In still yet another embodiment, the processor 1001 is further configured to: receive HARQ-ACK information fed back on the PUCCH resource indicated by the broadcast multicast scheduling signaling when the terminal detects that the HARQ-ACK feedback slot indicated by the broadcast multicast scheduling signaling and the slot in which the uplink resource is located do not both exist in the preset window.

In still yet another embodiment, when the number of uplink resources is two or more, the first HARQ-ACK codebook is multiplexed on the uplink resource closest to the start reference position of the preset window; or the first HARQ-ACK code is multiplexed on a first uplink resource within the preset window.

The base station according to the embodiments of the present application can perform each process implemented by the base station in the foregoing embodiments, and to avoid repetition, details are not described herein again.

The solutions according to the embodiments of the present application have been described from the perspective of electronic devices. It can be understood that, in order to provide the above-mentioned functions, the electronic device provided by the embodiments of the present application includes corresponding hardware structures and/or software modules for executing each function. Embodiments of the present application can be implemented in hardware or a combination of hardware and computer software with the units and algorithm steps of each example described in conjunction with the embodiments disclosed in the present application.

Whether some function is executed by a computer software or driving hardware depends on the specific application and design constraint conditions of the solution. Professionals and technicians can use different methods for each specific application to implement the described functions, but such implementation should not be considered beyond the scope of the present application.

In the embodiments of the present application, functional devices can be divided into electronic devices and the like according to the foregoing method examples. For example, each functional device can be divided corresponding to each function, or two or more functions can be integrated into a processing device. The above-mentioned integrated unit can be implemented in the form of hardware or software functional unit.

It should be noted that, the division of devices in the embodiments of the present application is schematic, and is only a logical function division, and there may be other division manners in actual implementation.

For the convenience and conciseness of the description, only the division of the above-mentioned functional devices is used for illustration. In practical applications, the above-mentioned functions can be allocated to different functional devices as required. The internal structure of the device is divided into different functional devices to complete all or part of the functions described above. For the specific working process of the system, apparatus and unit described above, reference may be made to the corresponding process in the foregoing method embodiments, and details are not described herein again.

In the several embodiments provided in the present application, it should be understood that the disclosed device and method may be implemented in other manners. For example, the device embodiments described above are only illustrative. For example, the division of the devices or units is only a logical function division and there may be other division methods in actual implementation. For example, multiple units or elements may be Incorporation may either be integrated into another system, or some features may be omitted, or not implemented. On the other hand, the shown or discussed mutual coupling or direct coupling or communication connection may be indirect coupling or communication connection of devices or units through some interfaces.

The units described as separate components may or may not be physically separate, and the components displayed as units may or may not be physical units, that is, may be located at the same place, or it can be distributed to multiple network units. Some or all of the units may be selected according to actual needs to achieve the purpose of the solution of the present embodiment.

In addition, the functional units in the various embodiments of the present application may be integrated into one processing unit, or each unit may exist alone physically, or two or more units may be integrated into one unit. The above-mentioned integrated units may be implemented in the form of software functional units.

If the integrated unit is implemented in the form of a software functional unit and sold or used as an independent product, it can be stored in a computer readable storage medium. Based on such understanding, a part of or all the solutions may be embodied in the form of a software product, which is stored in a storage medium, including several instructions to cause a computer device (which may be a personal computer, server, or network device, etc.) to perform all or part of the steps of the methods described in the respective embodiments of the present application. The computer storage medium is a non-transitory medium, including: flash memory, removable hard disk, read-only memory, random access memory, magnetic disk or optical disk and other mediums that can store program codes.

In another aspect, an embodiment of the present application also provides a computer-readable storage medium having computer programs stored thereon, that, when executed by a processor, causes the processor to perform the steps of the methods described in various embodiments of the present application and may provide the same benefits, which will not be repeated here.

What is claimed is:

1. A hybrid automatic repeat request-acknowledgment (HARQ-ACK) feedback method, performed by a terminal, comprising:

receiving broadcast/multicast scheduling signaling transmitted by a base station, and determining an uplink resource corresponding to unicast;

multiplexing, in response to detecting that a preset condition is satisfied, a first HARQ-ACK codebook corresponding to the broadcast/multicast scheduling signaling on the uplink resource corresponding to unicast, the preset condition being that both a HARQ-ACK feedback slot indicated by the broadcast/multicast scheduling signaling and a slot in which the uplink resource is located exist within a preset window, wherein a start reference position of the preset window comprises at least one of:

a position of the HARQ-ACK feedback slot indicated by the broadcast/multicast scheduling signaling; or a slot in which the PUCCH resource indicated by the unicast scheduling signaling is located; or an end time of a physical downlink shared channel (PDSCH) corresponding to the broadcast/multicast scheduling signaling; or a slot in which one of periodic uplink resources configured by the base station is located; or a time for receiving broadcast/multicast scheduling signaling; and wherein the start position offset and/or the length of the preset window satisfies any of the following:

the start position offset of the preset window is a positive value, a negative value, or 0 in response to the start reference position being a position of the HARQ-ACK feedback slot indicated by the broadcast/multicast scheduling signaling or a position of the slot in which the PUCCH resource indicated by the unicast scheduling signaling is located, a length of the preset window is one slot; or the start position offset is d in response to the start reference position being the end time of the PDSCH corresponding to the broadcast/multicast scheduling signaling, wherein d is greater than or equal to the sum of a processing time for receiving PDSCH by the terminal and a time for multiplexing the first HARQ-ACK codebook corresponding to the broadcast/multicast scheduling signaling; or the start position offset is a negative value in response to the start reference position being a slot in which one of the periodic uplink resources configured by the base station is located, or the start position offset is a positive value or 0 in response the start reference position being a time for receiving the broadcast/multicast scheduling signaling, and the length of the preset window is from the start position to a position of the HARQ-ACK feedback slot indicated by the broadcast/multicast scheduling signaling.

2. The method of claim 1, wherein the determining the uplink resource corresponding to unicast comprises:
receiving unicast scheduling signaling transmitted by the base station, wherein the unicast scheduling signaling carries scheduling information for the uplink resource; or
receiving periodic uplink resource information configured by the base station through higher layer signaling, and determining the uplink resource corresponding to the unicast based on the periodic uplink resource information, wherein the periodic uplink resource information comprises a transmission period and a slot offset of the uplink resource,
wherein the uplink resource is a physical uplink control channel (PUCCH) resource or a physical uplink shared channel (PUSCH) resource;
wherein
a second DCI corresponding to the unicast scheduling signaling comprises a response message used for indicating the terminal whether to carry the first HARQ-ACK codebook in the uplink resource.

3. The method of claim 2, wherein
the response message comprises a second indication field and identification information of the first HARQ-ACK codebook, the second indication field is used for indicating whether to carry the first HARQ-ACK codebook in the uplink resource, a new field with the response message is added in the second DCI, or an original field in the second DCI is used by an indication meaning for the response message,
wherein there is a correspondence between the identification information of each HARQ-ACK codebook and the codebook number of the HARQ-ACK; or
the response message comprises a K bits carrying-identified bitmap, K represents a maximum number of HARQ-ACK codebooks for broadcast/multicast, in response to a value of a bit being a first preset value, a corresponding HARQ-ACK codebook is carried, and in response to the value of the bit being a second preset value, no corresponding HARQ-ACK codebook is carried.

4. The method of claim 1, further comprising:
obtaining configuration information of the preset window predefined by a protocol; or
receiving the configuration information of the preset window transmitted by the base station through higher layer signaling, and the configuration information comprises a start reference position, a start position offset of the preset window and a length of the preset window.

5. The method of claim 1, wherein in response to the first HARQ-ACK codebook corresponding to the broadcast/multicast scheduling signaling is multiplexed on the uplink resource corresponding to the unicast, an order, in the uplink resource, of the first HARQ-ACK codebook and a second HARQ-ACK codebook that is already in the uplink resource satisfies at least one of:
the second HARQ-ACK codebook is appended to the first HARQ-ACK codebook; or
the first HARQ-ACK codebook is appended to the second HARQ-ACK codebook, or
the first HARQ-ACK codebook and the second HARQ-ACK codebook are arranged in a sequential order of the PUCCH resource corresponding to the first HARQ-ACK codebook before multiplexing and the PUCCH resource corresponding to the second HARQ-ACK codebook; or
the first HARQ-ACK codebook and the second HARQ-ACK codebook arranged in a receiving order of the broadcast/multicast scheduling signaling and the unicast scheduling signaling.

6. The method of claim 1, wherein in response to the number of the broadcast/multicast scheduling signaling being two or more, and two or more first HARQ-ACK codebooks corresponding to the two or more broadcast/multicast scheduling signaling are multiplexed on the uplink resources, the two or more first HARQ-ACK codebooks are arranged in the uplink resources in an order as follows:
the two or more first HARQ-ACK codebooks are arranged in a sequential order of a first HARQ-ACK feedback time indicated by each broadcast/multicast scheduling signaling, wherein the two or more first HARQ-ACK codebooks are arranged in an ascending order of numbers of carriers in response to the first HARQ-ACK feedback times indicated by the two or more broadcast/multicast scheduling signaling being the same, and the two or more first HARQ-ACK codebooks are arranged in an ascending order of indexes of broadcast/multicast services in response to the first HARQ-ACK feedback times indicated by the two or more broadcast/multicast scheduling signaling being the same and the numbers of carriers being the same; or
the two or more first HARQ-ACK codebooks are arranged in an index order of the first HARQ-ACK codebooks indicated by each broadcast/multicast scheduling signaling.

7. The method of claim 1, further comprising: in response to detecting that the HARQ-ACK feedback slot indicated by the broadcast/multicast scheduling signaling and a slot where the uplink resource is located do not both exist in the preset window,
skipping feeding back HARQ-ACK information indicated by the broadcast/multicast scheduling signaling, or
feeding back HARQ-ACK information on a PUCCH resource indicated by the broadcast/multicast scheduling signaling.

8. The method of claim 1, wherein in response to the number of uplink resources is two or more, the multiplexing a first HARQ-ACK codebook corresponding to the broadcast/multicast scheduling signaling on the uplink resource corresponding to unicast comprises:
multiplexing the first HARQ-ACK codebook on an uplink resource closest to the start reference position of the preset window; or
multiplexing the first HARQ-ACK codebook on a first uplink resource in the preset window.

9. A hybrid automatic repeat request-acknowledgment (HARQ-ACK) feedback method, performed by a base station, comprising:
transmitting broadcast/multicast scheduling signaling to a terminal for indicating the terminal to multiplex, in response to detecting that a preset condition is satisfied, a first HARQ-ACK codebook corresponding to the broadcast/multicast scheduling signaling on an uplink resource corresponding to unicast, the preset condition being that a HARQ-ACK feedback slot indicated by the broadcast/multicast scheduling signaling and a slot in which the uplink resource is located exist simultaneously within a preset window; and receiving uplink data transmitted by the terminal through the uplink resource in response to the preset condition being satisfied, and obtaining a first HARQ-ACK codebook multiplexed on the uplink resource, wherein a start reference position of the preset window satisfies at least one of:

a position of the HARQ-ACK feedback slot indicated by the broadcast/multicast scheduling signaling; or a slot in which the PUCCH resource indicated by the unicast scheduling signaling is located; or an end time of a physical downlink shared channel (PDSCH) corresponding to the broadcast/multicast scheduling signaling; or a slot in which one of periodic uplink resources configured by the base station is located; or a time for receiving broadcast/multicast scheduling signaling; and wherein the start position offset and/or the length of the preset window satisfies at least one of:

the start position offset of the preset window is a positive value, a negative value, or 0 in response to the start reference position being a position of the HARQ-ACK feedback slot indicated by the broadcast/multicast scheduling signaling or a position of the slot in which the PUCCH resource indicated by the unicast scheduling signaling is located, a length of the preset window is one slot; or the start position offset is d in response to the start reference position being the end time of the PDSCH corresponding to the broadcast/multicast scheduling signaling, wherein d is greater than or equal to the sum of a processing time for receiving PDSCH by the terminal and a time for multiplexing the first HARQ-ACK codebook corresponding to the broadcast/multicast scheduling signaling; or the start position offset is a negative value in response to the start reference position being a slot in which one of the periodic uplink resources configured by the base station is located, or the start position offset is a positive value or 0 in response to the start reference position being a time for receiving the broadcast/multicast scheduling signaling, and the length of the preset window is from the start position to a position of the HARQ-ACK feedback slot indicated by the broadcast/multicast scheduling signaling.

10. The method of claim 9, further comprising:

transmitting unicast scheduling signaling to the terminal, wherein the unicast scheduling signaling carries scheduling information for the uplink resource; or configuring periodic uplink resource information for the terminal by higher layer signaling for indicating the terminal to determine an uplink resource corresponding to unicast based on the periodic uplink resource information, wherein the periodic uplink resource information comprises a transmission period and a slot offset of the uplink resource, wherein the uplink resource is a physical uplink control channel (PUCCH) resource or a physical uplink shared channel (PUSCH) resource;

wherein a second DCI corresponding to the unicast scheduling signaling comprises a response message used for indicating the terminal whether to carry the first HARQ-ACK codebook in the uplink resource.

11. The method of claim 10, wherein:

the response message comprises a second indication field and identification information of the first HARQ-ACK codebook, the second indication field is used for indicating whether to carry the first HARQ-ACK codebook in the uplink resource, a new field with the response message is added in the second DCI, or an original field in the second DCI is used by an indication meaning for the response message, wherein there is a correspondence between the identification information of each HARQ-ACK codebook and the codebook number of the HARQ-ACK; or the response message comprises a K bits carrying-identified bitmap, K represents a maximum number of HARQ-ACK codebooks for broadcast/multicast, in response to a value of a bit being a first preset value, a corresponding HARQ-ACK codebooks is carried and in response to the value of the bit is being a second preset value, no corresponding HARQ-ACK codebook is carried.

12. The method of claim 9, further comprising:

obtaining configuration information of the preset window predefined by a protocol; or transmitting the configuration information of the preset window to the terminal through a higher layer signaling, and the configuration information comprises a start reference position, a start position offset of the preset window and a length of the preset window.

13. The method of claim 9, wherein an order, in the uplink resource, of the first HARQ-ACK codebook and a second HARQ-ACK codebook that is already in the uplink resource satisfies one of the following cases:

the second HARQ-ACK codebook is appended to the first HARQ-ACK codebook; or the first HARQ-ACK codebook is appended to the second HARQ-ACK codebook; or the first HARQ-ACK codebook and the second HARQ-ACK codebook are arranged in a sequential order of the PUCCH resource corresponding to the first HARQ-ACK codebook before multiplexing and the PUCCH resource corresponding to the second HARQ-ACK codebook; or the first HARQ-ACK codebook and the second HARQ-ACK codebook are arranged in a receiving order of the broadcast/multicast scheduling signaling and the unicast scheduling signaling.

14. The method of claim 9, wherein in response to the number of the broadcast/multicast scheduling signaling being two or more, and two or more first HARQ-ACK codebooks corresponding to the two or more broadcast/multicast scheduling signaling are multiplexed on the uplink resources, the two or more first HARQ-ACK codebooks are arranged on the uplink resources in an order as follows:

the two or more first HARQ-ACK codebooks are arranged in a sequential order of a first HARQ-ACK feedback time indicated by each broadcast/multicast scheduling signaling, wherein the two or more first HARQ-ACK codebooks are arranged in an ascending order of numbers of carriers in response to the first HARQ-ACK feedback times indicated by the two or more broadcast/multicast scheduling signaling being the same, and the two or more first HARQ-ACK codebooks are arranged in an ascending order of indexes of broadcast/multicast services in response to the first HARQ-ACK feedback times indicated by the two or more broadcast/multicast scheduling signaling being the same and the numbers of carriers being the same; or the two or more first HARQ-ACK codebooks are arranged in an index order of the first HARQ-ACK codebooks indicated by each broadcast/multicast scheduling signaling.

15. The method of claim 9, further comprising:
receiving HARQ-ACK information fed back on a PUCCH resource indicated by the broadcast/multicast scheduling signaling in response to the terminal detects that the HARQ-ACK feedback slot indicated by the broadcast/multicast scheduling signaling and the slot in which the uplink resource is located not both existing in the preset window.

16. The method of claim 9, wherein in response to the number of uplink resources is two or more,
the first HARQ-ACK codebook is multiplexed on an uplink resource closest to the start reference position of the preset window; or
the first HARQ-ACK codebook is multiplexed on a first uplink resource in the preset window.

17. A base station, comprising a processor, and a memory having computer programs stored thereon, that, when executed by the processor, cause the processor to perform the following steps of claim 9.

18. A terminal, comprising a processor, and a memory having computer programs stored thereon, that, when executed by the processor, cause the processor to perform at least one of:
receiving broadcast/multicast scheduling signaling transmitted by a base station, and determining an uplink resource corresponding to unicast; and
multiplexing, in response to detecting that a preset condition is satisfied, a first hybrid automatic repeat request-acknowledgment (HARQ-ACK) codebook corresponding to the broadcast/multicast scheduling signaling on the uplink resource corresponding to unicast, the preset condition being that both a HARQ-ACK feedback slot indicated by the broadcast/multicast scheduling signaling and a slot in which the uplink resource is located exist within a preset window,
wherein a start reference position of the preset window comprises at least one of:
a position of the HARQ-ACK feedback slot indicated by the broadcast/multicast scheduling signaling; or
a slot in which the PUCCH resource indicated by the unicast scheduling signaling is located; or
an end time of a physical downlink shared channel (PDSCH) corresponding to the broadcast/multicast scheduling signaling; or
a slot in which one of periodic uplink resources configured by the base station is located; or
a time for receiving broadcast/multicast scheduling signaling; and
wherein the start position offset and/or the length of the preset window satisfies any of the following:
the start position offset of the preset window is a positive value, a negative value, or 0 in response to the start reference position being a position of the HARQ-ACK feedback slot indicated by the broadcast/multicast scheduling signaling or a position of the slot in which the PUCCH resource indicated by the unicast scheduling signaling is located, a length of the preset window is one slot; or
the start position offset is d in response to the start reference position being the end time of the PDSCH corresponding to the broadcast/multicast scheduling signaling, wherein d is greater than or equal to the sum of a processing time for receiving PDSCH by the terminal and a time for multiplexing the first HARQ-ACK codebook corresponding to the broadcast/multicast scheduling signaling; or
the start position offset is a negative value in response to the start reference position being a slot in which one of the periodic uplink resources configured by the base station is located, or
the start position offset is a positive value or 0 in response the start reference position being a time for receiving the broadcast/multicast scheduling signaling, and the length of the preset window is from the start position to a position of the HARQ-ACK feedback slot indicated by the broadcast/multicast scheduling signaling.

* * * * *